United States Patent
Widdowson et al.

(10) Patent No.: US 9,047,496 B1
(45) Date of Patent: Jun. 2, 2015

(54) METHOD AND SYSTEM FOR FINDING DATA OBJECTS WITHIN LARGE DATA-OBJECT LIBRARIES

(75) Inventors: Simon Widdowson, Dublin, CA (US); Ramin Samadani, Menlo Park, CA (US); Ullas Gargi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2154 days.

(21) Appl. No.: 11/799,127

(22) Filed: Apr. 30, 2007

Related U.S. Application Data

(63) Continuation-in-part of application No. 11/408,855, filed on Apr. 21, 2006, now abandoned.

(51) Int. Cl.
*G06F 17/30* (2006.01)
*G06K 9/00* (2006.01)
(52) U.S. Cl.
CPC ........................................ *G06K 9/00* (2013.01)
(58) Field of Classification Search
CPC ................................................ G06K 9/00248
USPC ................................................... 707/772, 776
See application file for complete search history.

(56) References Cited

U.S. PATENT DOCUMENTS

| 6,347,313 B1 * | 2/2002 | Ma et al. ........................... 707/3 |
| 2003/0074369 A1 * | 4/2003 | Schuetze et al. .......... 707/103 R |

* cited by examiner

*Primary Examiner* — Baoquoc N To
(74) *Attorney, Agent, or Firm* — Olympic Patent Works

(57) ABSTRACT

Various embodiments of the present invention include a grazing routine that selects data objects from a data-object library or database based on selection-criterion values associated with each data object and provides the data objects to a presentation routine that uses the data objects to continuously update a data-object presentation. User input directs subsequent data-object selection by the grazing routine to allow users to intuitively navigate and search a large data-object library in order to locate one or a set of particular data objects. Users can input selection commands to specific presented data-objects in order to focus subsequent data-object selection and data-object presentation to increasingly smaller subpopulations of data objects. In the absence of user input, the sub-population of data objects from which data objects are selected for presentation may be increased.

20 Claims, 33 Drawing Sheets

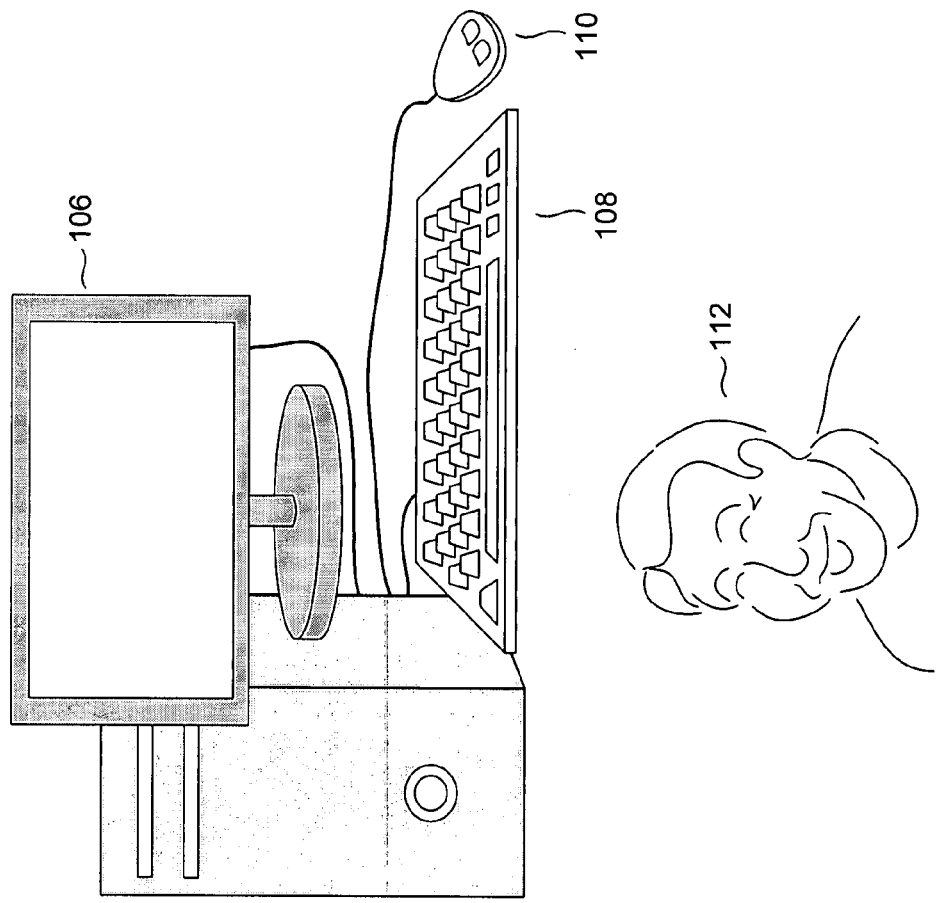
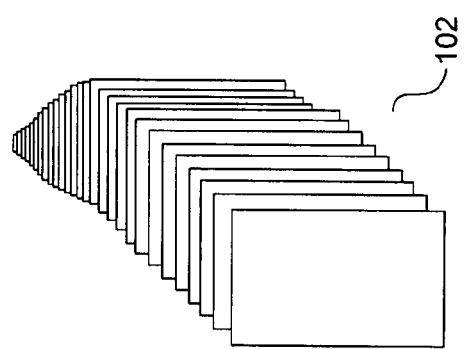
Figure 1

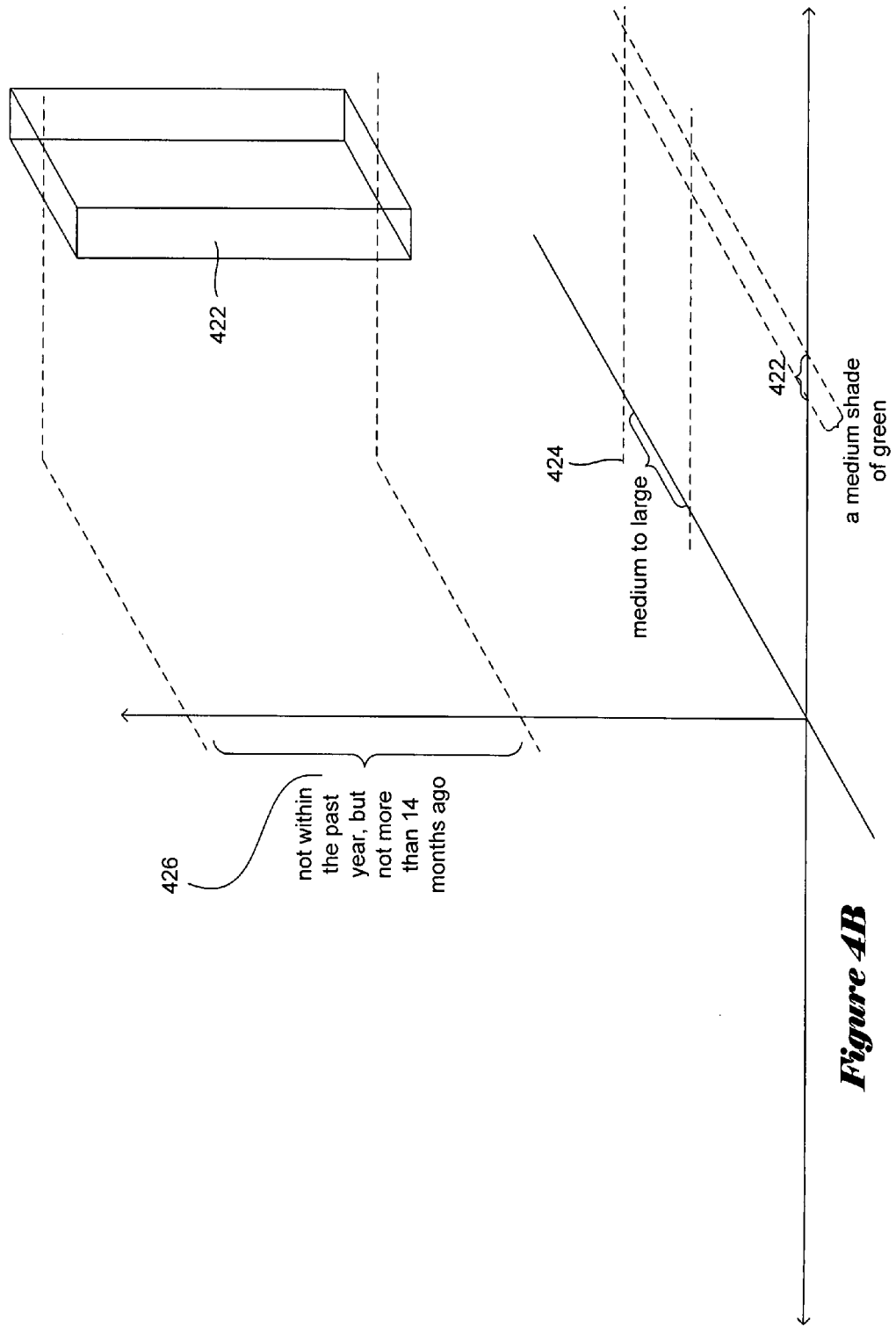

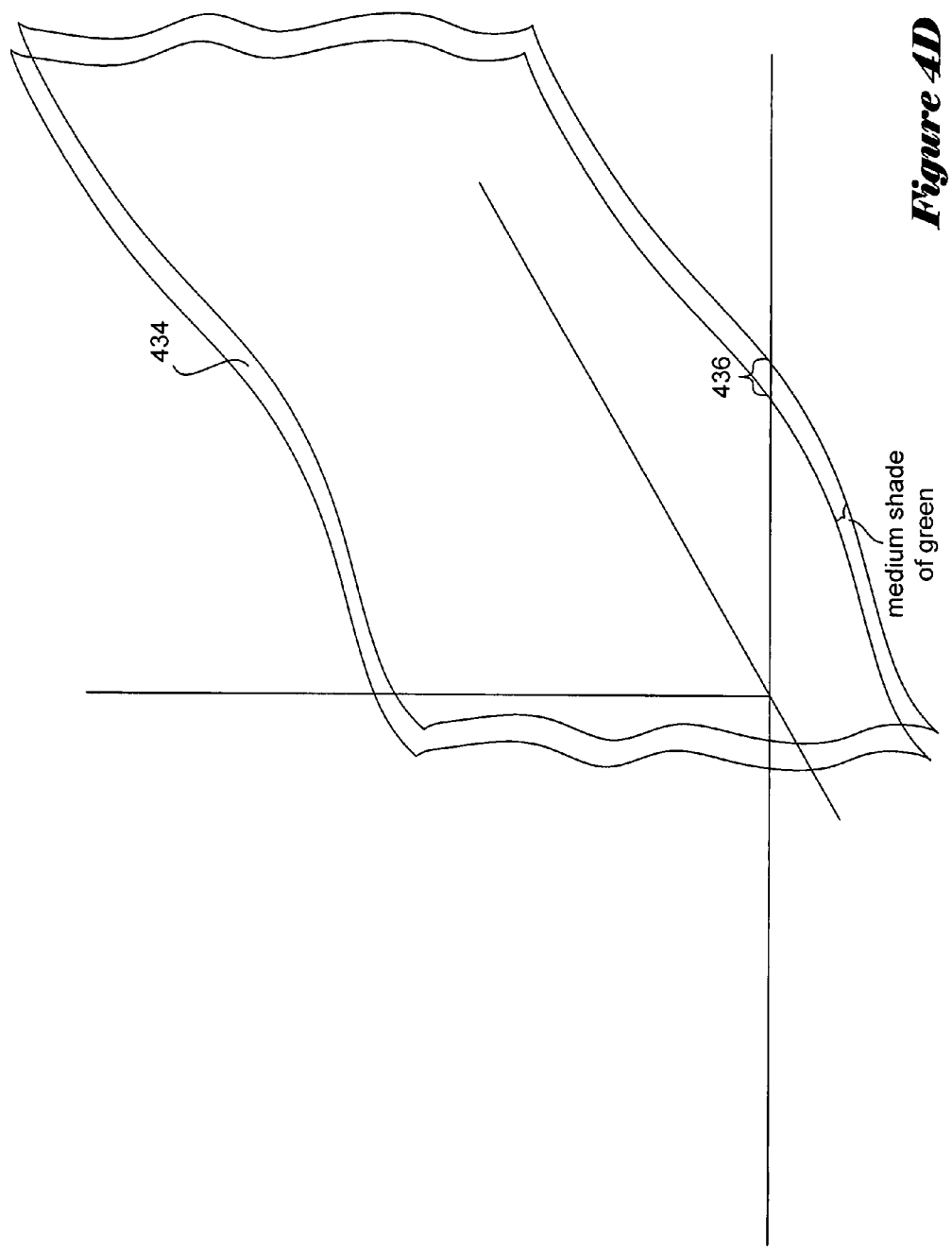

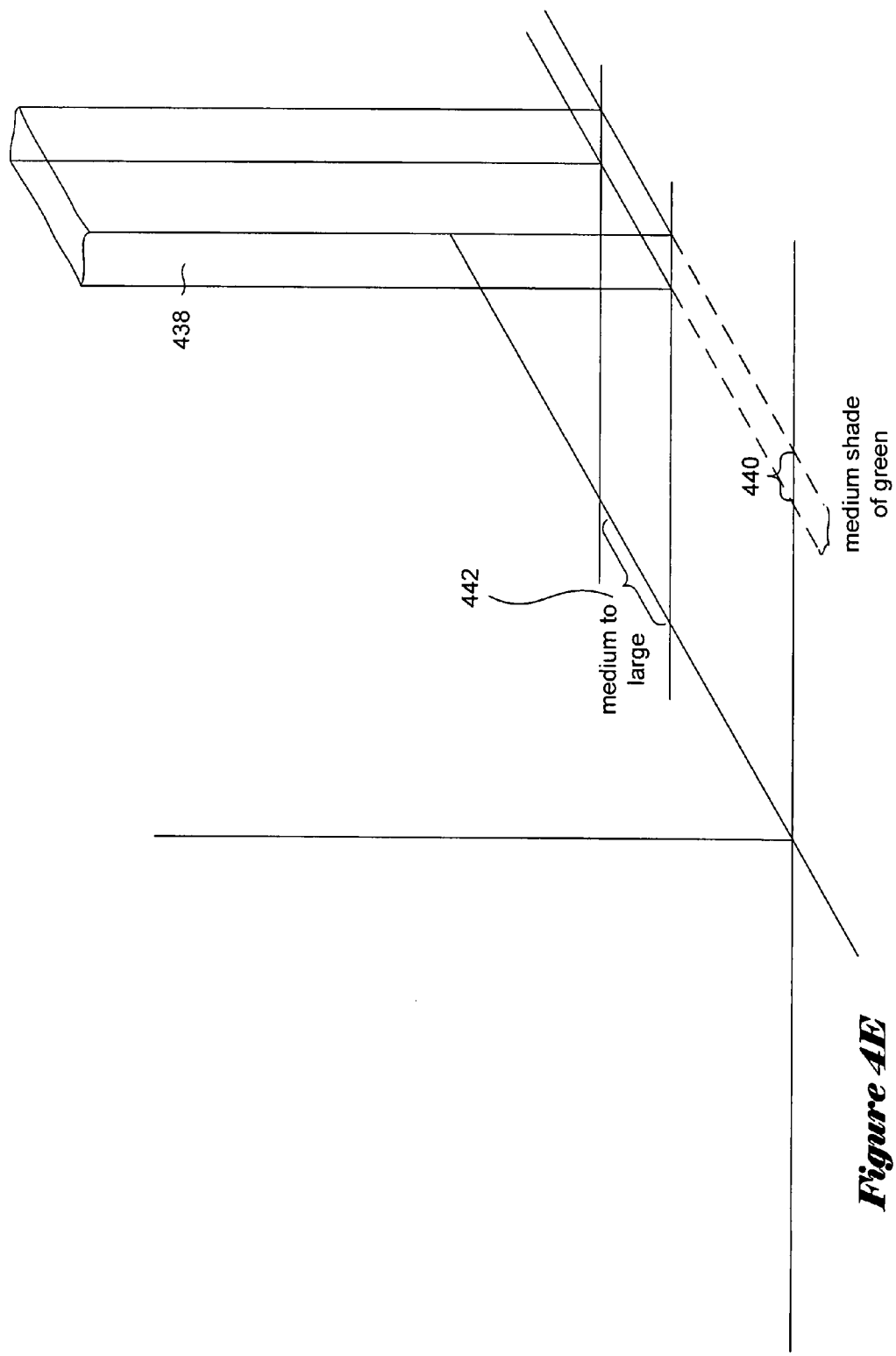

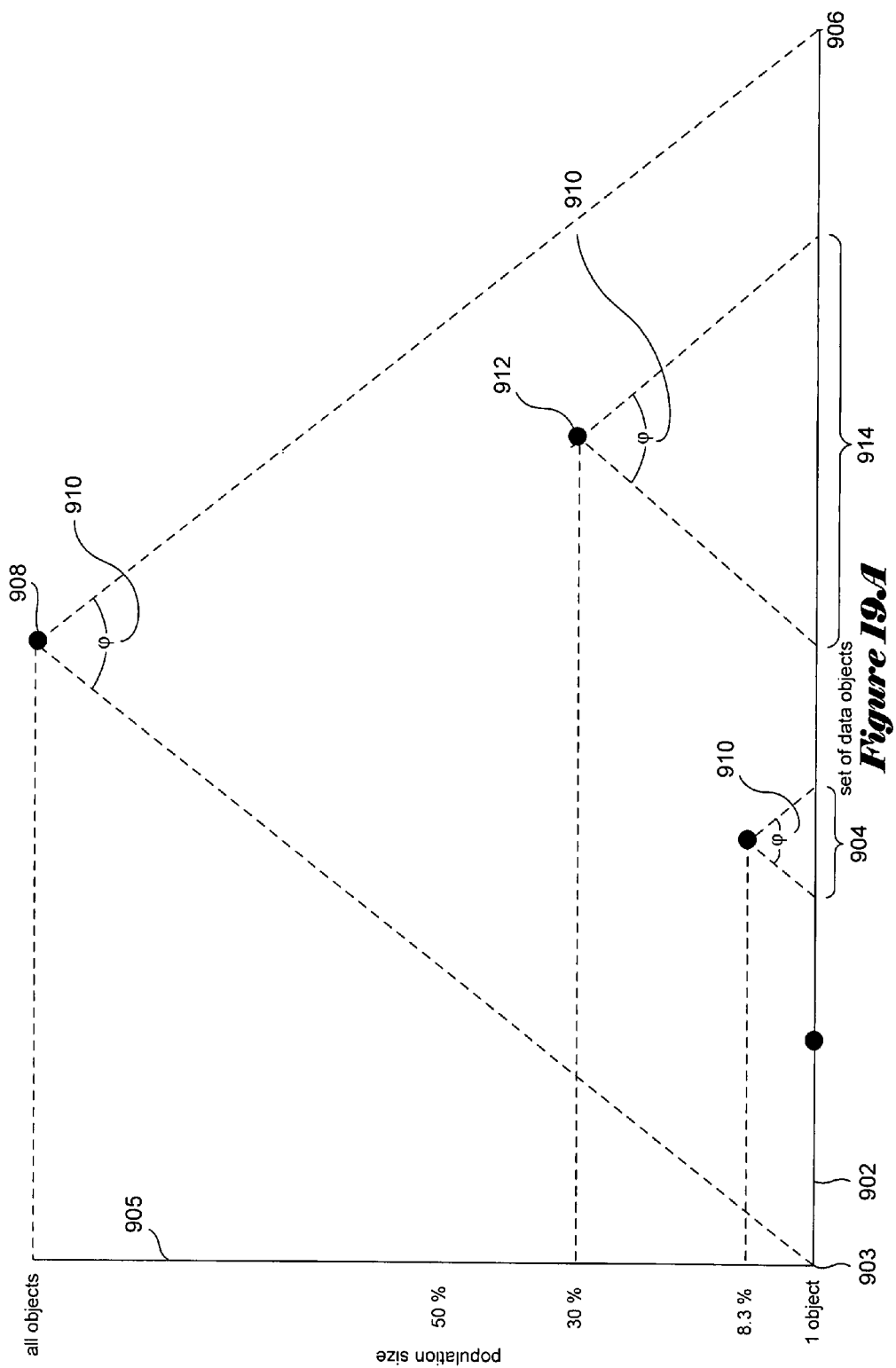

set of data objects

METHOD AND SYSTEM FOR FINDING DATA OBJECTS WITHIN LARGE DATA-OBJECT LIBRARIES

CROSS-REFERENCE TO RELATED APPLICATION

This application is a continuation-in-part of application Ser. No. 11/408,855, filed Apr. 21, 2006 now abandoned.

TECHNICAL FIELD

The present invention is related to electronic-data storage and to electronic user interfaces and, in particular, provides method and system embodiments that allow human users to navigate a large library of data objects by directed browsing of a data-object presentation.

BACKGROUND OF THE INVENTION

During the past 30 years, computer systems have evolved from relatively simple processing engines with limited memories and mass-storage capacities that primarily operated on alpha-numeric input, text files, and numeric data files to high-powered, multi-processor processing engines that access vast local memories and high-capacity local mass storage devices via internal buses as well as vast remote memories and extremely high-capacity mass storage devices via various types of external communications media. Modern computers are capable of storing, managing, and accessing terabytes and even petabytes of a wide variety of different types of digitally encoded data, including video and audio data, photographic images, text-based and numeric data, and many types of complex data objects generated, stored, managed, and retrieved by a variety of different data management applications and systems. Many modern data management systems provide various types of indexing and data-object-locating facilities. For example, attribute values for attributes associated with a data object can be assigned to the data object during or following storage of the data object, and query-based data-management and data-retrieval facilities provided by modern data management systems can locate data objects having attributes with attribute values that satisfy criteria expressed in attribute-value-based queries.

Unfortunately, the capacities of modern computer-based data-object storage, management, and retrieval systems often exceed the data-object location facilities provided by these systems. Attribute values may be constrained to relatively short text strings, integer values, and other primitives which lack the expressive power, flexibility; and natural-language capabilities needed by human users to classify data objects for storage, retrieval, and location.

As one example, it may be exceedingly difficult for a human user to formulate queries using relational-database query languages or other such simple, algebraic query languages in order to find one or a few photographic images within a large database containing hundreds of thousands of photographic images. The user would need to understand and remember the various types of attributes and attribute values that have been associated with photographic images within the database in order to formulate queries to find photographic images. Moreover, many of the queries that a user might want to make may require attributes and attribute values previously assigned to data objects with extremely high levels of foresight, and may involve very complex queries as well as procedural techniques for directly querying the content of photographic images.

As one example, a user may desire to find all photographic images within a library that include sub-images of a child between the ages of two and four playing with a beach ball. Although it is possible that a Boolean-valued attribute child_playing_with_a_beach_ball_included may have been associated with each photographic image, it is highly unlikely that attributes of such particularity would have been specified during photographic-image storage and characterization operations. In the case that titles have been stored for each photographic image, it might be possible to locate candidate photographic images by retrieving photographic images that include the phrase "beach ball" within the titles, but the list of photographic images satisfying that criterion would almost certainly be vastly over-inclusive as well as vastly under-inclusive. Many might, for example, include sub-images of beach balls without children, or with children outside the specified age range of 2-4. On the other hand, many images that do include the desired sub-image might have titles that do not include the phrase "beach ball," such as "Aunt Alice's Big Day at the Beach."

Alternatively, a procedure could be developed to electronically access a photographic image and search the image for sub-images of small children playing with beach balls. However, the cost to develop such procedures would be extremely high, development would require copious amounts of time and significant financial expenditure, and application of the procedure to all of the images in a large image database, or image library, would use prodigious amounts of processing cycles and processing time, resulting in impractical searches or searches that could simply not be performed, even with unlimited financial resources. The data-storage requirements for storing a sufficiently large number of such specialized procedures would generally be prohibitive, as well, and could easily exceed the data-storage used to store the photographic images.

Thus, current techniques by which human users can locate photographic images within photographic-image libraries, and other types of complex data objects within other types of complex-data-object libraries, are often inadequate. As ever increasingly complex software applications generate greater and greater amounts of data of ever increasing complexity, the need for better methods to allow users to locate particular data objects within large data-object libraries is rapidly increasing, and has been identified as a critical problem in a variety of fields, from database management systems and electronic-data archiving systems to management and processing of scientific data and development of internet search engines.

SUMMARY OF THE MENTION

Various embodiments of the present invention include a grazing routine that selects data objects from a data-object library or database based on selection-criterion values associated with each data object and provides the data objects to a presentation routine that uses the data objects to continuously update a data-object presentation. User input directs subsequent data-object selection by the grazing routine to allow users to intuitively navigate and search a large data-object library in order to locate one or a set of particular data objects. Users can input selection commands to specific presented data-objects in order to focus subsequent data-object selection and data-object presentation to increasingly smaller sub-populations of data objects. In the absence of user input, the sub-population of data objects from which data objects are selected for presentation may be increased.

BRIEF DESCRIPTION OF THE DRAWINGS

FIG. 1 illustrates the basic components of a large data-object-library search problem.

FIGS. 4A-E illustrate multi-dimensional data-object spaces and multi-dimensional-data-object-space searching.

FIGS. 7A-I illustrate changes in a current sub-population resulting from user input and from automatic data-object-selection-criteria relaxation due to user inactivity according to various embodiments of the present invention.

FIGS. 9A-D illustrate typical user searches conducted by using various embodiments of the present invention.

DETAILED DESCRIPTION OF THE INVENTION

Figure 2:
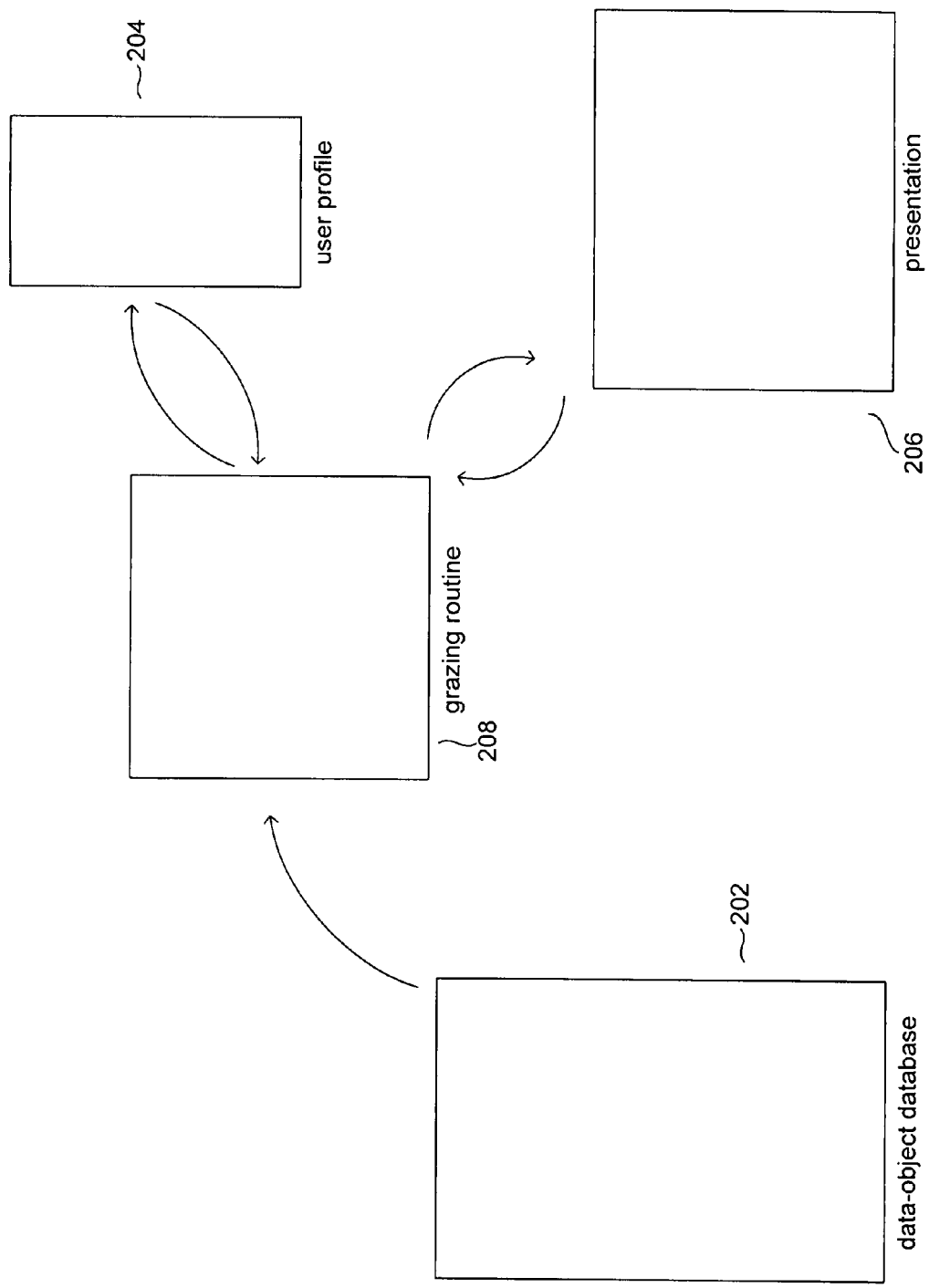
FIG. 2 illustrates the abstract, computational entities to which the problem domain illustrated in FIG. 1 is mapped by various method and system embodiments of the present invention.

Various method and system embodiments of the present invention provide both a user interface as well as intuitive data-object-library navigation and search facilities to allow human users to locate particular data objects of interest within large data-object databases or data-object libraries. These method and system embodiments of the present invention are particular useful for complex data objects that can be visually presented to a user, including data objects that represent photographic images, video clips, documents, and other complex data objects. However, the general method and system embodiments of the present invention can be applied to navigation and searching of a wide variety of different types of data-object libraries. In a first subsection, below, a grazing application that represents a general embodiment of the present invention is described. In a following subsection, object-selection methods that represent particular embodiments of the present invention are discussed.

A General Grazing-Application Embodiment of the Present Invention

FIG. 1 illustrates the basic components of a large data-object library search problem. In the current discussion, an example is used, for purposes of describing the present invention, in which data objects are considered to be photographic images that are digitally encoded and electronically stored within an electronic-data storage system. For purposes of the current discussion, the library of photographic images 102 includes at least 1000 photographic images, and would generally include tens of thousands, hundreds of thousands, or greater numbers of photographic images. Photographic images can be accessed from the library via a computer system 104 and displayed for viewing by a human user on a display device 106 connected to the computer system. The computer system includes user input devices 108 and 110 that allow a human user to input image-retrieval criteria, to customize display of photographic images, and to select particular images or groups of images for various purposes, including storing in local directories, printing, or inputting to various types of software applications. A search of the image library 102 is conducted by a human user 112, who may be searching for particular images that the user recollects, who may be searching for particular categories of images that meet a criteria formulated by the user, or who may wish simply to peruse the image library in order to become familiar with the contents of the image library or carry out various types of research or knowledge-acquisition tasks.

It should be noted that there are a variety of different types of electronic-data storage systems for storing large data-object libraries, such as photographic-image libraries. A data-object library may be stored remotely from the user's computer system and accessed via any of various communications media and communications systems, may be stored in a collection of removable mass-storage devices accessible from the user's local computer, or may be stored within memory and mass-storage devices within, or directly connected to, the user's local computer. The particular electronic-data storage system employed to store the data-object library may provide various levels of attribute-based query searching, management, storage, and retrieval operations, and may also provide a variety of different data-object display facilities. However, as discussed in a previous subsection, such query-based searching, or index-based organizational tools, are often inadequate for users wishing to efficiently conduct a wide variety of natural-language-level, conceptual, data-object searches, such as finding photographic images that include a sub-image of a small child playing with a beach ball, as discussed above.

FIG. 2 illustrates the abstract, computational entities to which the problem domain illustrated in FIG. 1 is mapped by various method and system embodiments of the present invention. The data-object library (102 in FIG. 1) is mapped to an electronic data-object database 202 that generally provides well-defined storage, attribute-based searching, indexing, and retrieval operations. The human user (112 in FIG. 1) is characterized by a user profile 204, a digitally encoded data structure that stores general characteristics and attributes of a human user, various user preferences, and specific criteria relevant to a current search of the data-object database. The visual display device (106 in FIG. 1) and software applications controlling display or presentation of data objects is mapped to a presentation routine 206, discussed in greater detail below with respect to the photographic-image-library searching embodiment of the present invention. As discussed, audio devices and audio-device-controlling software may be used for data-objects more naturally and effectively presented as sound. Other types of presentation devices and controlling software are possible, including, for example, tactile devices for blind users. A grazing routine 208 implements various method embodiments of the present invention by controlling selection of data objects from the data-object database 202 for input to the presentation routine 206 to facilitate directed browsing and data-object searching by a user described by the contents of the user-profile data structure 204, and which receives inputs from a user that are passed to the grazing routine and used by the grazing routine to update the user profile 204 in order to direct data-object-library browsing or searching in accordance with the user's inputs.

Figure 3:
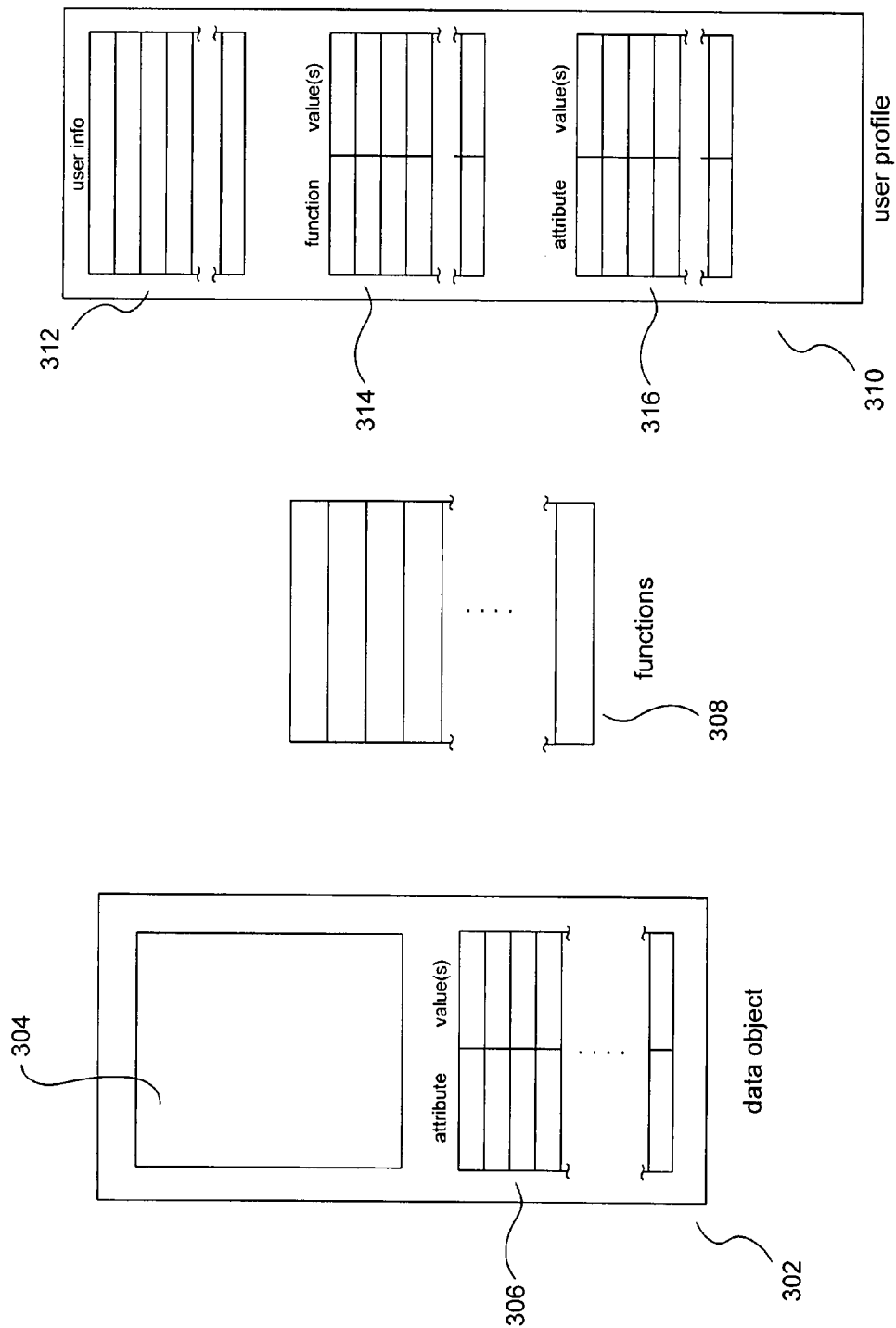
FIG. 3 illustrates an exemplary data object and an exemplary user profile employed in certain embodiments of the present invention.

FIG. 3 illustrates an exemplary data object and an exemplary user profile employed in certain embodiments of the present invention. In the case of a photographic-image data-object library, a separate data object may be used to represent each photographic image. In certain systems, the data object 302 may include a binary-encoded photographic image 304, often in a compressed form, as well as a list of attribute/attribute-value pairs 306 that describe the photographic image. In many systems, the attribute/attribute-value pairs may be separately stored from the binary-encoded photographic image, and related to the image through a file name, data-object identifier, or other such digitally encoded reference. In addition to attribute/attribute-value pairs, the contents of a photographic-image data object may be characterizable by application of some number of functions 308 generally provided by the data-object database. For example, a photographic-image database may provide functions to allow a user to determine the distribution of various types of colors within the photographic image, to carry out various image-processing and image-characterization methods, such as edge detection, ellipse detection, or detection of sub-images that may correspond to images of particular types of objects or people, and other such functions. A user profile 310 may include a variety of fields 312 that encode general characteristics and preferences of a particular user, as well as lists or sets of function/function-value pairs 314, attribute/attribute-value pairs 316, and other digitally-encoded data that describe currently formulated criteria for searching for data objects within the data-object library.

Exact details of data objects and user profiles depend on the specific implementations and capabilities of the various computer systems for which the grazing routine or grazing system is implemented. The exemplary data object and user profile shown in FIG. 3 are meant to illustrate one possible family of implementations, rather than inclusively describe or define a possible range of data objects and user profiles.

FIGS. 4A-E illustrate multi-dimensional data-object spaces and multi-dimensional-data-object-space searching. FIGS. 4A-E employ a 3-dimensional attribute-based data-object space as an exemplary multi-dimensional data-object space, for ease of illustration, but the dimensionality of data-object spaces used to represent the contents of large data-object libraries for which the method and system embodiments of the present invention are particularly useful may be very large, from tens to hundreds of dimensions, and larger numbers of dimensions. However, the present invention can also be used for one-dimensional and two-dimensional data-object spaces.

In the examples of FIGS. 4A-E, the sub-volumes describing sub-populations of data objects are shown as single compact volumes, although, in most cases, a sub-population is described by multiple unconnected sub-volumes. In the examples below, one dimension of the 3-dimensional data-object space is defined by a color attribute. Although all of the illustrated sub-population-defining sub-volumes involve a single point or segment of the color axis, many sub-populations that would naturally arise in typical searching and directed browsing of data objects involve multiple points and line segments of the color axis, and would therefore be described by multiple unconnected sub-volumes within 3-dimensional data-object space. For example, a sub-population might be partially or completely defined as all data objects that are either blue, red, or a combination of blue and red. Thus, although, for illustration clarity, all sub-populations discussed with reference to FIGS. 4A-E are described by a single sub-volume in 3-dimensional data-object space, most common sub-populations would be fined by many, and often a great many unconnected sub-volumes.

Figure 4A:
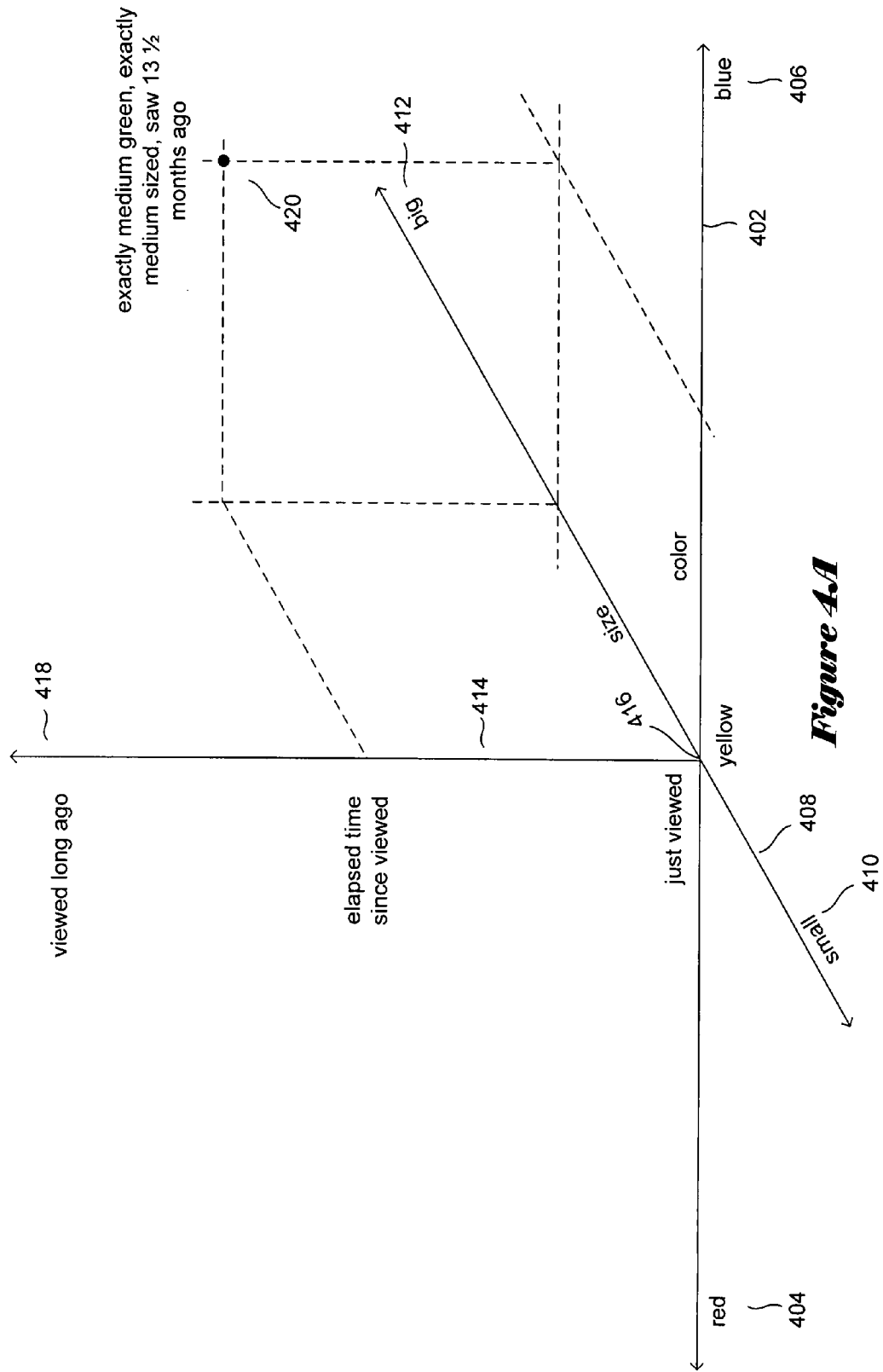

FIG. 4A shows an exemplary 3-dimensional data-object space. One or more data objects may occupy any given point within the 3-dimensional volume defined by the ranges of possible values for attributes corresponding to each dimension. In the example of FIGS. 4A-E, a first dimension, represented by a first axis 402, corresponds to the color of an object, and ranges from red 404 to blue 406. A second dimension, represented by a second axis 408, corresponds to the size of an object, and ranges from small 410 to big 412. A third dimension, represented by a third axis 414, represents the time elapsed since the object was viewed or accessed by a user. The elapsed time ranges from zero, or just viewed, 416 to viewed a very long time ago 418. A data object may be characterized by a combination of color, size, and elapsed time since viewed. For example, one or more data objects may be characterized by the point 420 in the 3-dimensional data-object space that represents an object that is exactly medium green in color, exactly medium sized, and last viewed 13½ months ago.

FIG. 4B illustrates a sub-volume of 3-dimensional data-object space. In FIG. 3, a subset or sub-population of data objects within the 3-dimensional data-object space is represented by a small sub-volume 422 of the 3-dimensional data-object space. This subset of objects is characterized as having a color within a range of colors 422 that can be described as a medium shade of green, having a range of sizes 424 that can be characterized as from medium to large, and having been last viewed at least a year ago, but not more than 14 months ago 426. Thus, by relaxing the constraints presented by the values and attributes used to characterize the object, or, in other words, employing ranges rather than exact values for the attributes, a sub-volume of 3-dimensional data-object space that may potentially contain many more data objects is described. Of course, the 3-dimensional data-object space may not be uniformly populated, so a large sub-volume may not necessarily describe more data objects in the total population than a smaller sub-volume. However, for the purposes of the current discussion, the volume of a sub-space may be regarded as generally proportional to the number of data objects characterized by the attribute values that define the sub-volume.

Figure 4C:
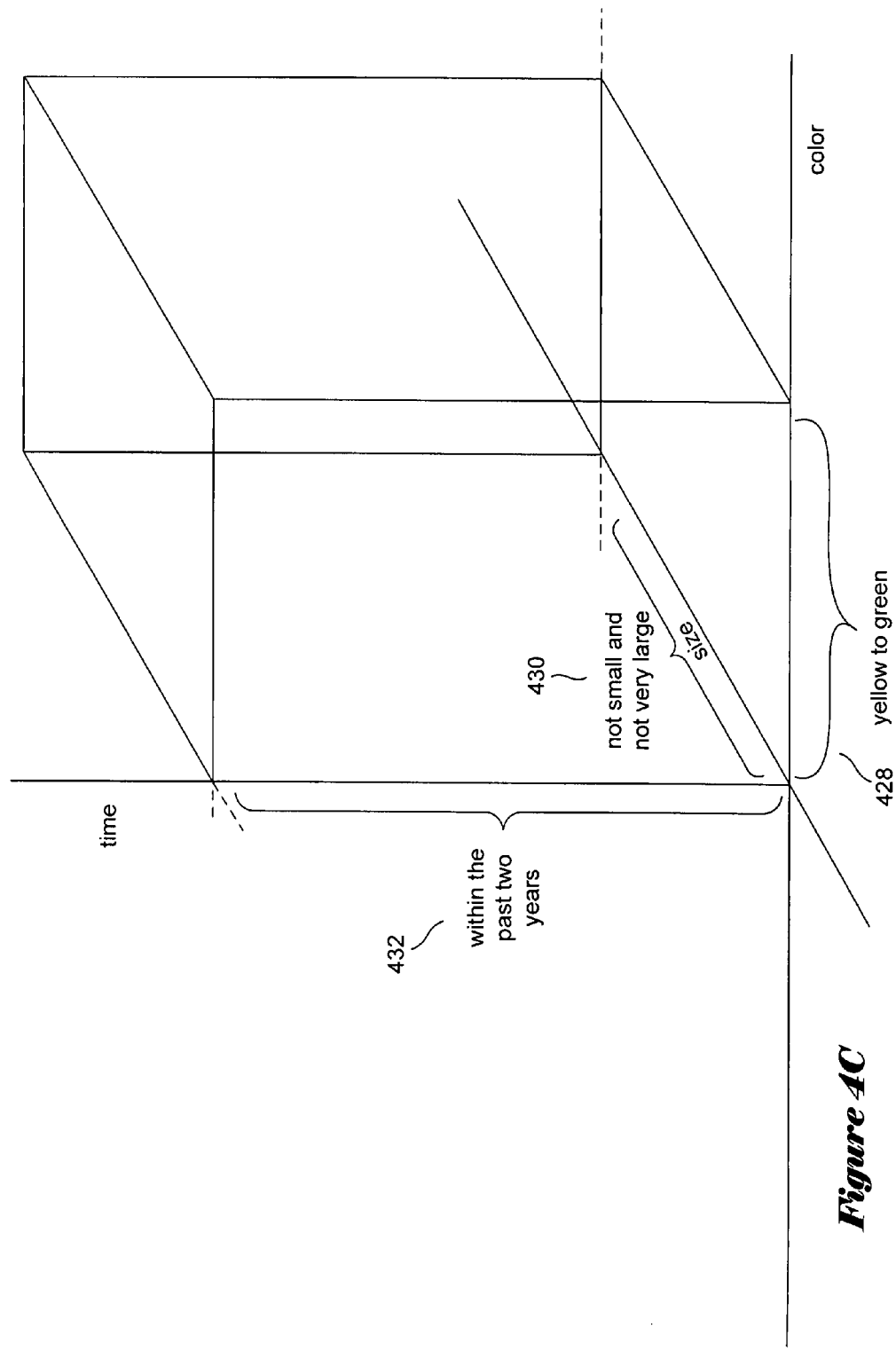

FIG. 4C shows an even larger sub-volume of the 3-dimensional data-object space shown in FIG. 4A. The attribute-value ranges have been expanded, in FIG. 4C, to: (1) a color between yellow and green 428; (2) a size between not small and not very large 430; and (3) an elapsed time since previous viewing from between 0 and 2 years 432. The larger sub-volume shown in FIG. 4C potentially contains a much larger number of data objects than the small sub-volume shown in FIG. 4B.

FIG. 4D shows a sub-volume of the 3-dimensional data-object volume shown in FIG. 4A characterized by a single range of values for a single dimension. The sub-volume 434 can be describes as including all data objects having a range of colors characterized as a medium shade of green 436. The size and elapsed time since viewing are not specified. Therefore, the sub-volume is a slice of the 3-dimensional data-object volume perpendicular to the color axis. FIG. 4E shows a sub-volume of the 3-dimensional data-object volume shown in FIG. 4A obtained when value ranges for two of three attributes are specified. The sub-volume 438 shown in FIG. 4E corresponds to data objects with a range of colors characterized as a medium shade of green 440 and a range of sizes 442 characterized as from medium to large. The sub-volume 438 is unbounded in the positive, elapsed-time-since-viewing direction, since no elapsed time since viewing is specified.

Figure 5A:
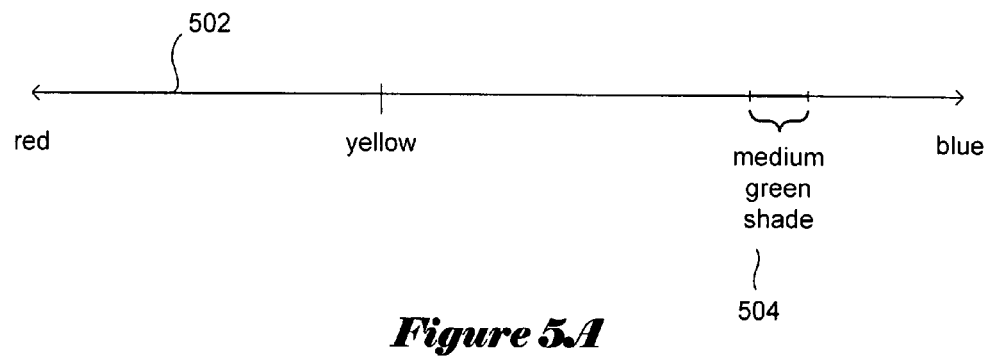
FIGS. 5A-B illustrates 1-dimensional and 2-dimensional projections of the 3-dimensional sub-volume illustrated in FIG. 4D.
Figure 5B:
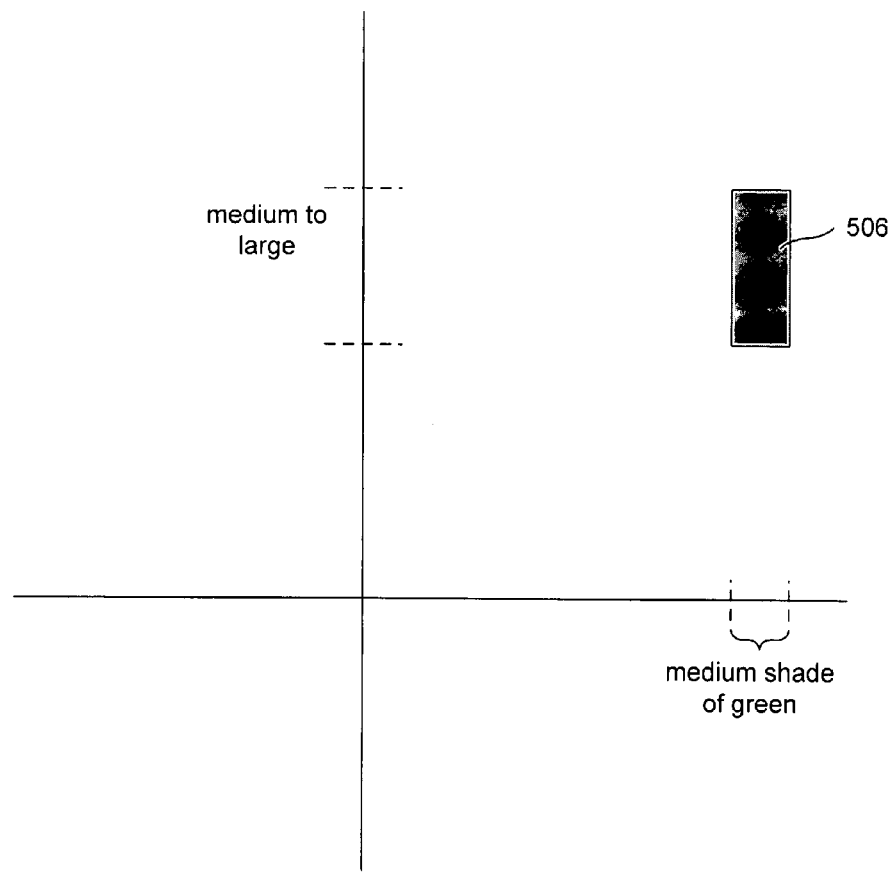

FIGS. 5A-B illustrates 1-dimensional and 2-dimensional projections of the 3-dimensional sub-volume illustrated in FIG. 4D. FIG. 5A illustrates the sub-volume illustrated in FIG. 4D projected onto a single color axis 502. When the value of only a single dimension is specified, the total number of data objects can be considered to be projected onto the axis representing that dimension. The data objects in the sub-volume 434 illustrated in FIG. 4D correspond to the line segment 504 of the color axis that describes colors characterized as medium shades of green. Similarly, when only two of the three attribute dimensions are specified, the 3-dimensional data-object space shown in FIG. 4A can be projected onto a plane containing the two axes, or dimensions, for which values are specified. FIG. 5B shows the sub-volume 438 in FIG. 4E projected onto the size/color plane containing the size and color axes of the three-dimensional data-object space. The sub-volume 438 is projected onto a rectangular area 506 in the 2-dimensional projection corresponding to objects with colors characterized as medium shades of green and objects that are from medium to large size.

For purposes of the current discussion, the size of the data-object library may be considered to fixed, although, in most common implementations, the number of data objects stored within the data-object library may continuously change as data objects are added and deleted. Because the number of data objects in a data-object library is essentially fixed, the density of data objects within an r-dimensional sub-volume of an r-dimensional subspace of an n-dimensional data-object space is potentially much higher than the density of data objects within an equivalent n-dimensional subspace of the n-dimensional data-object space. For example, considering FIGS. 4E and 5B, the same number of data objects that reside in the 3-dimensional sub-volume 438 of the three-dimensional data object space shown in FIG. 4E reside in the 2-dimensional area 506 of the 2-dimensional data-object space shown in FIG. 5B. A group of data objects can therefore be more precisely defined using three attribute values for the three possible dimensions than by using two attribute values for two of the three dimensions or one attribute value for one dimension, since a small, precisely defined 3-dimensional sub-volume of the sub-volume 438 in FIG. 4E can generally be expected to contain far fewer data objects than an equivalently precisely defined sub-area of the 2-dimensional area 506 of a 2-dimensional data-object-space projection and far more precisely than an equivalently precisely defined sub-segment of the line segment 504 in the 1-dimensional projection of the data-object space. In conducting searches for data objects within an n-dimensional data-object space, as more attribute values for more attributes are specified, the number of data objects described by the total number of specified attribute/attribute-value pairs dramatically decreases. Adding an attribute value for a single additional dimension in a high-dimensional space may decrease the number of data objects characterized by a factor of from ten to hundreds, thousands, millions, or more. Thus, a search for data objects usually involves both specifying values or ranges of values for an increasing number of attributes, as well as narrowing attribute-value ranges specified for the attributes.

Figure 6A:
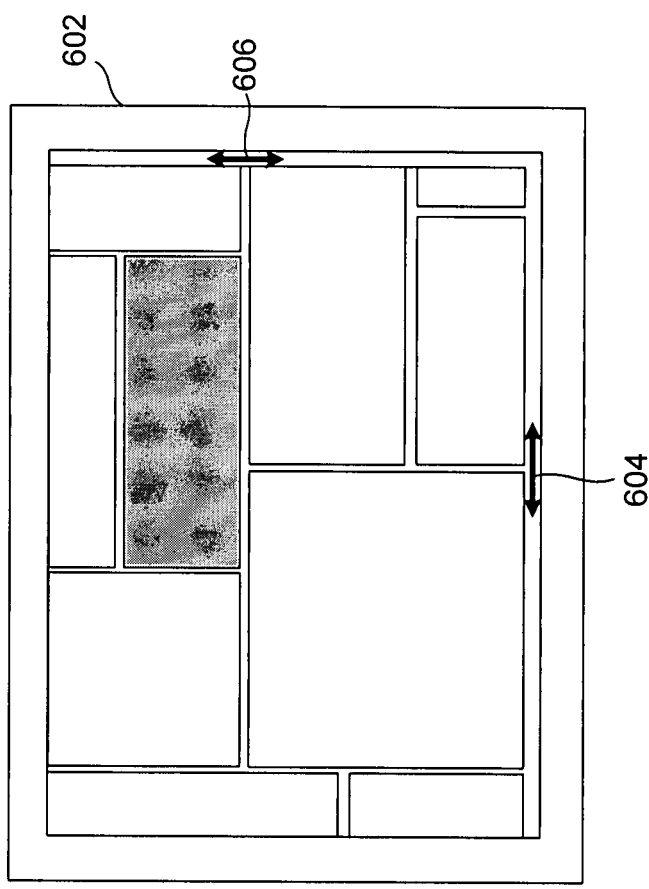
FIGS. 6A-F illustrate a photographic-image data-object presentation used in various photographic-image-based embodiments of the present invention.
Figure 6B:
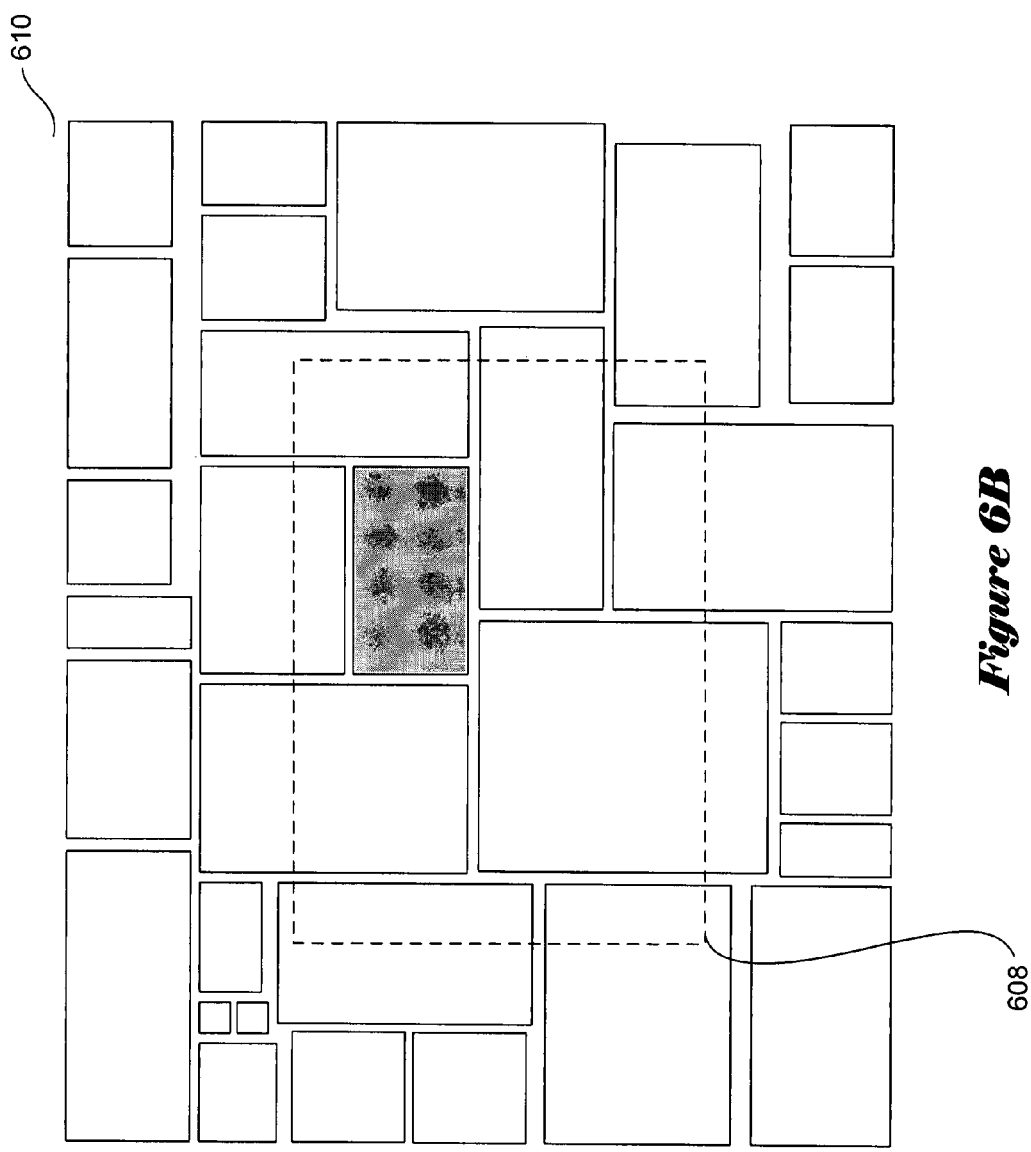
Figure 6C:
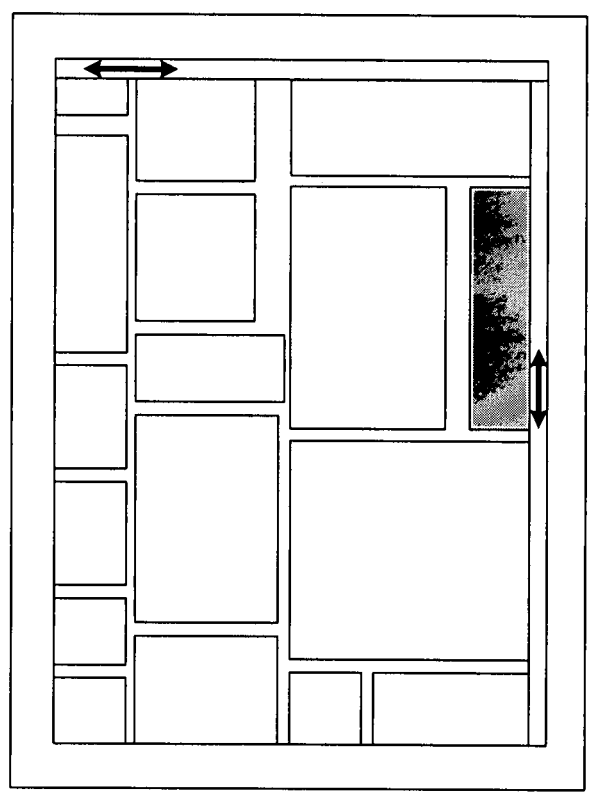
Figure 6D:
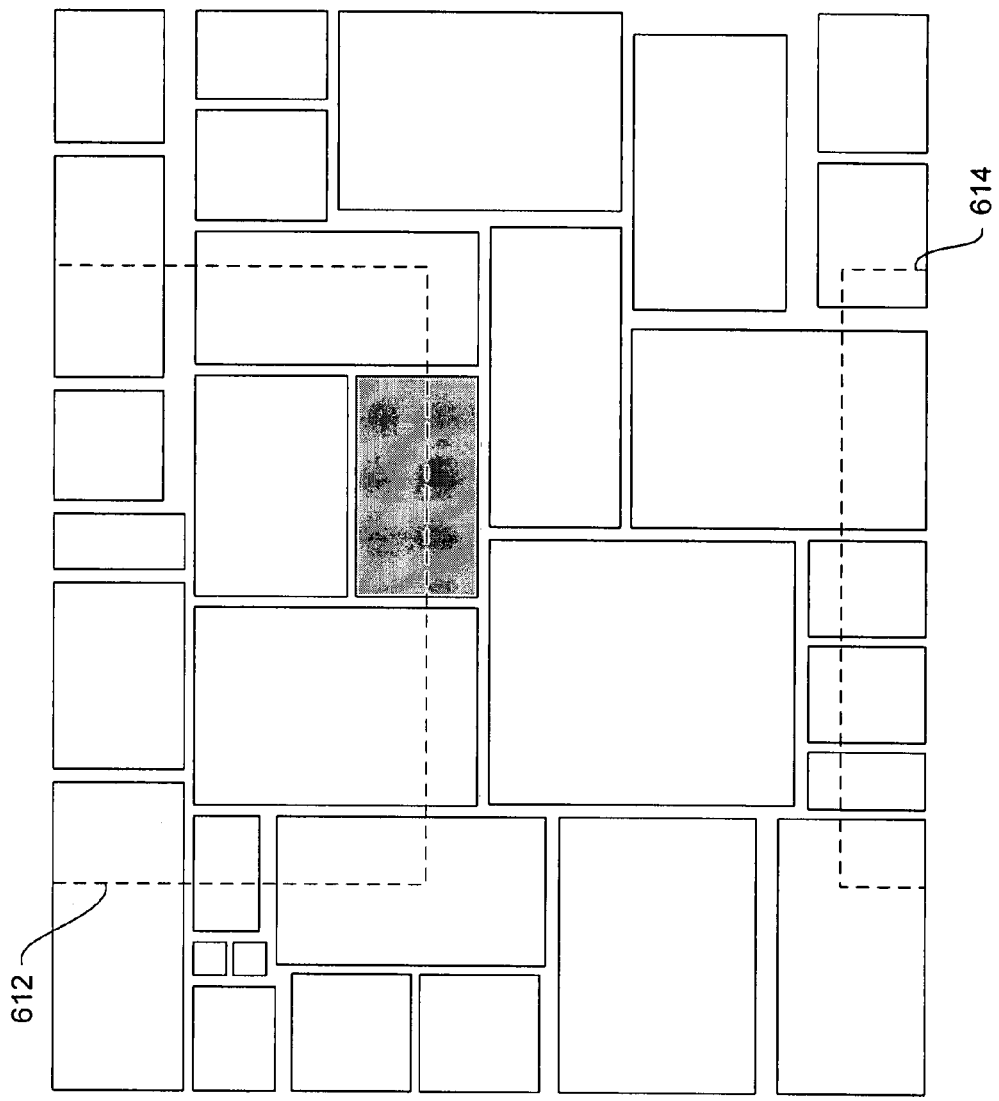

FIGS. 6A-B illustrate a photographic-image data-object presentation used in various photographic-image-based embodiments of the present invention. This same type of presentation may also be used for documents, video clips, and other readily visually displayable data-object types. FIG. 6A illustrates a computer monitor 602 on which a number of photographic images, represented by rectangles, are displayed. The presentation provides scrolling features 604 and 606 to allow the user to scroll horizontally and vertically, respectively, across a greater, logical photographic-image-displaying area. FIG. 6B illustrates the logical photographic-image-display area from which sub-areas are selected for display by the presentation routine. As shown in FIG. 6B, the area that can be displayed by the display monitor 608, shown in FIG. 6B as a rectangle of dashed lines, is smaller than the total abstract area of the logical photographic-image-display area 610. Using the scrolling features, a human user may move the display rectangle 608 horizontally and vertically over the logical photographic-image display area 610. For example, FIG. 6C shows a display selected from the logical photographic-image display area (610 in FIG. 6B) by scrolling vertically upward with respect to the display shown in FIG. 6A. As shown in FIG. 6D, the display window 612 has been moved vertically upward and wrapped over to the bottom portion 614 of the logical photographic-image display area, so that the logical photographic-image display area is essentially borderless in the vertical dimension. The logical photographic-image display area may be electronically represented by one or more coordinate pairs associated with each photographic image in a list of photographic images. The presentation may also provide features for scaling, rotation, and other standard image-altering commands.

In addition to user-input-directed scrolling, the presentation routine may provide tunable scrolling parameters, remote-procedure-call-based scrolling, or other means for controlling scrolling by the grazing routine, so that the grazing routine can scroll the display window in order to automatically present a well-distributed data-object sample set to a user. In addition, automated scrolling may be carried out by the presentation routine, independently, so that, without user direction, all data objects within the logical display area are displayed as the display window is scrolled automatically to provide a continuously changing display.

Figure 6E:
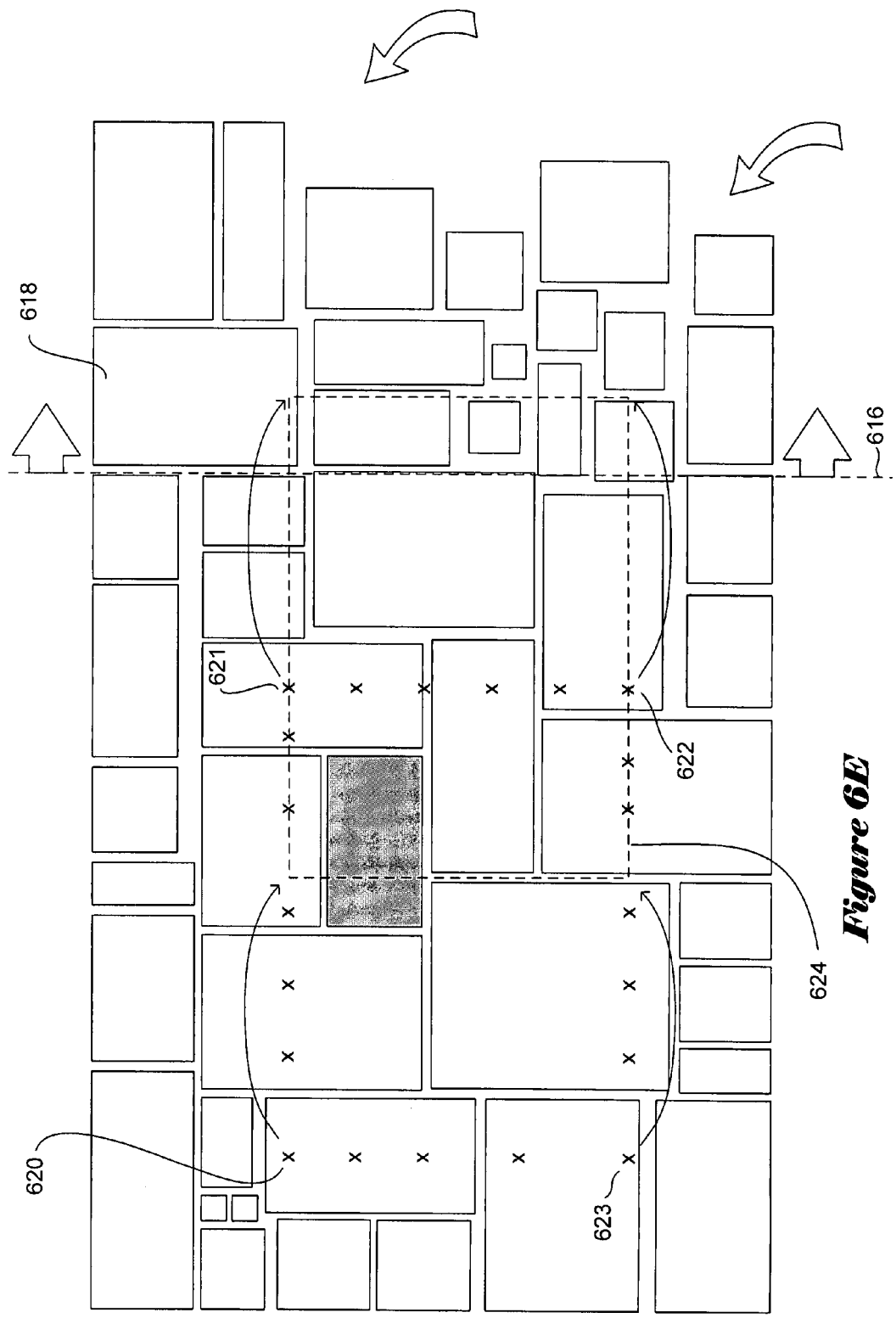
Figure 6F:
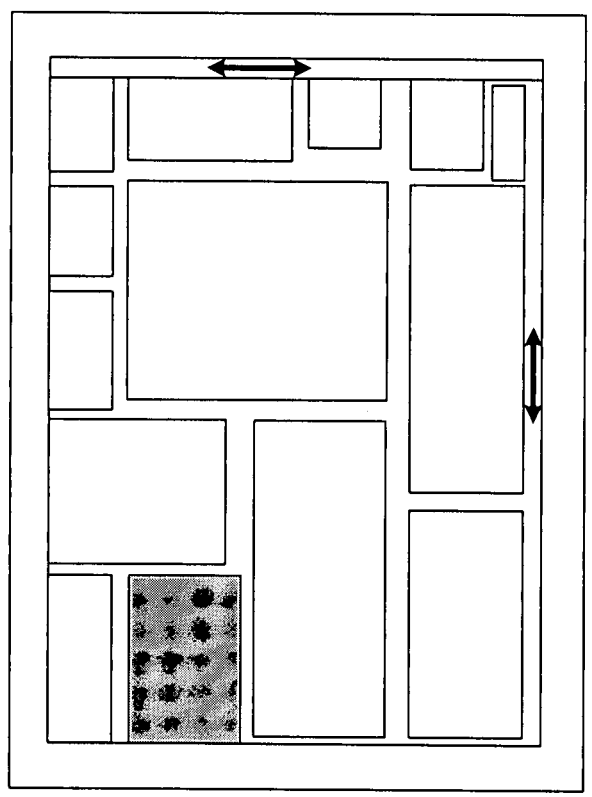

The presentation routine used in many embodiments of the present invention continuously appends new data objects to one edge of the logical data-object display area, and correspondingly and automatically translates the display window towards the edge to which new data-objects are appended. FIG. 6E illustrates the data-object appending process. In FIG. 6E, the previous right-hand edge of the logical photographic-image display area shown in FIGS. 6B and 6D is indicated by a dashed, vertical line 616. New data objects, such as data object 618, have been appended to the logical data-object display area by the presentation routine in a continuous fashion. Similarly, the display window has been translated rightward towards the edge of the logical display area to which new data objects are appended 616. The previously shown location of the display window included corners 620-623, shown by small "x" characters in FIG. 6E. Over time, the display window has been shifted rightward to the new location indicated by the rectangle of dashed lines 624. Presentation routines used in embodiments of the present invention continuously shift the display window rightward at a rate equivalent to the rate at which new display data-objects are added to the logical photographic-image display window so that a human user views a continuously scrolling display of photographic images.

In various embodiments of the present invention, the grazing routine continuously selects data objects from a current sub-population of data objects within a data-object library. The current sub-population is generally defined by previous user input or automatic constraint-relaxing functionality of the grazing routine, described below. In general, user input tends to continuously decrease the current sub-population size as user input adds attributes and attribute values to the criteria by which the sub-population is defined during data-object searches. The sub-population is a reflection of the inferences that can be drawn from user input as to the data-objects that are of current interest to the user. For example, attributes of a selected data object may be added to the current criteria that define the current sub-population of data objects from which data objects are selected for presentation. Data objects selected from the current sub-population are input to the presentation routine for appending to the logical data-object display area, so that, as the user continues to watch the displayed data objects scrolling across the user's display, and as the user inputs additional selections, the currently displayed data objects are of increasing interest to the user. A user may efficiently search the data-object library to locate one or a small number of data objects by steering the selection and display of data objects by the grazing routine.

Figure 7A:
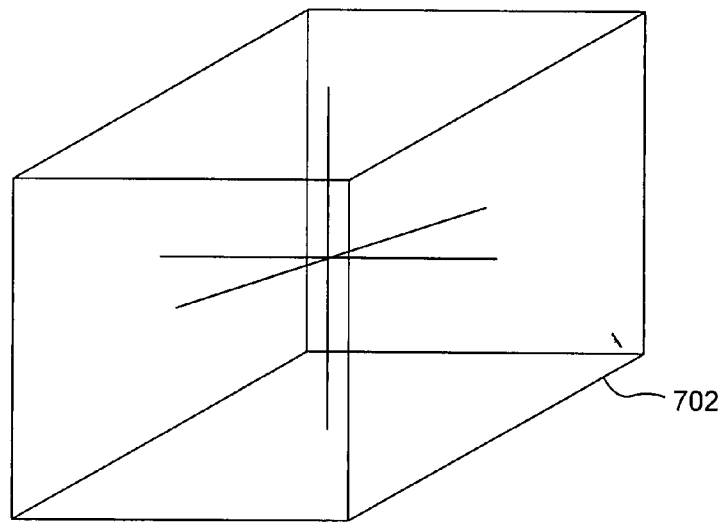
Figure 7B:
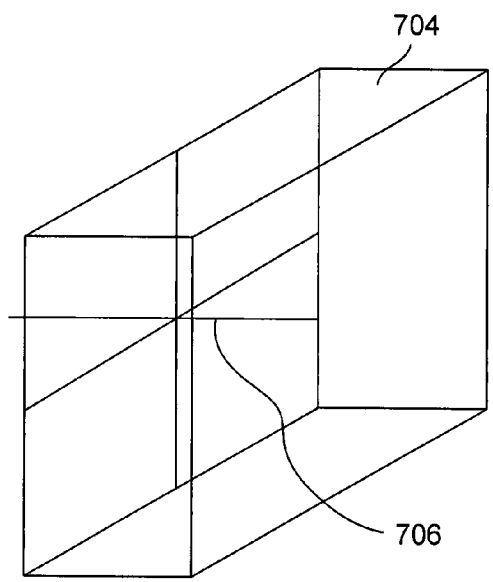
Figure 7C:
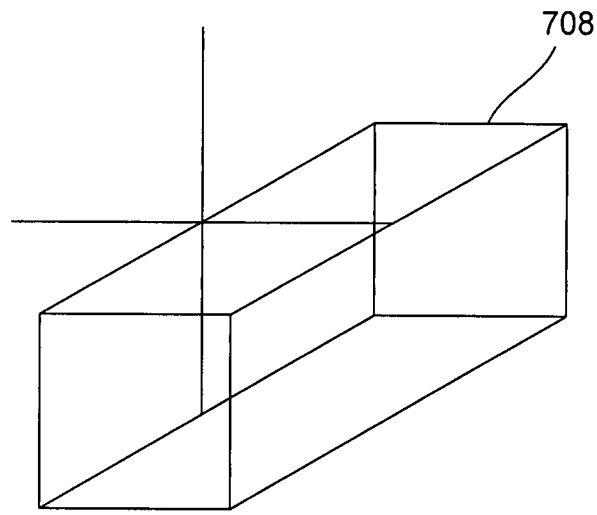
Figure 7D:
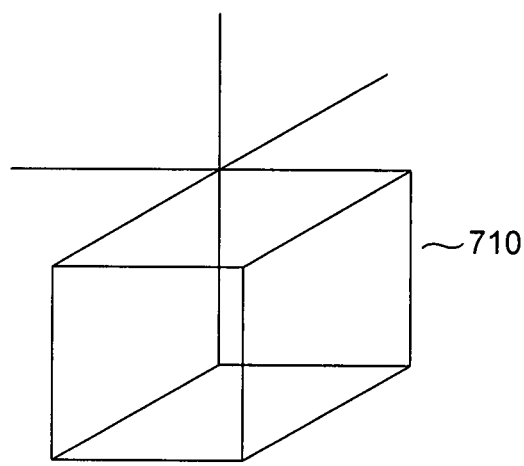
Figure 7E:
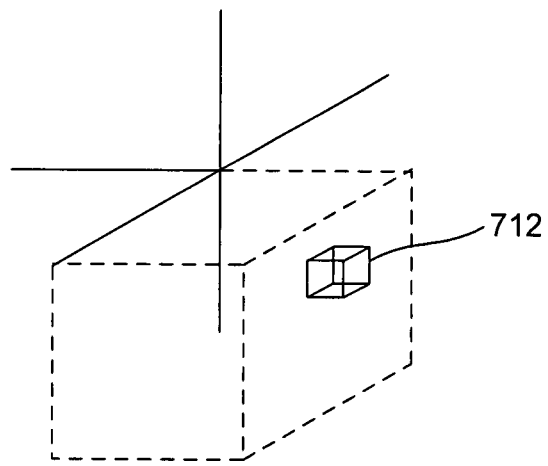
Figure 7F:
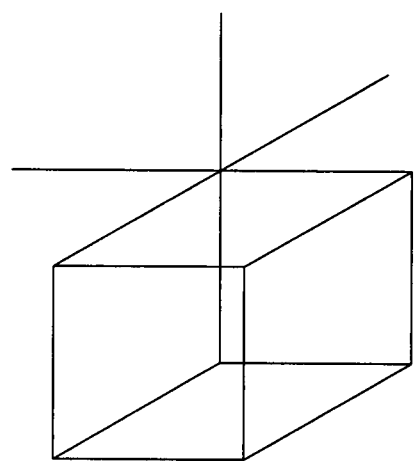
Figure 7G:
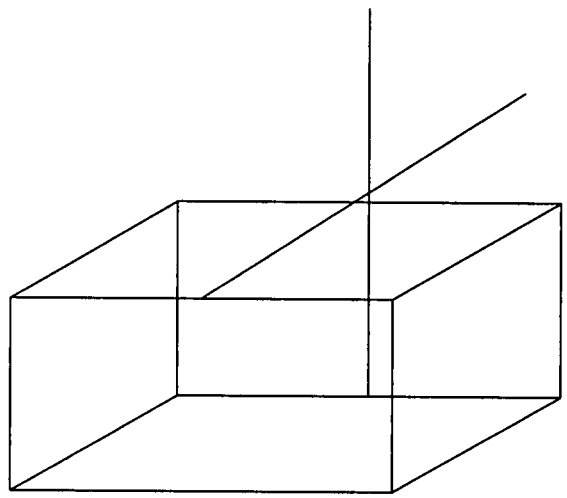
Figure 7H:
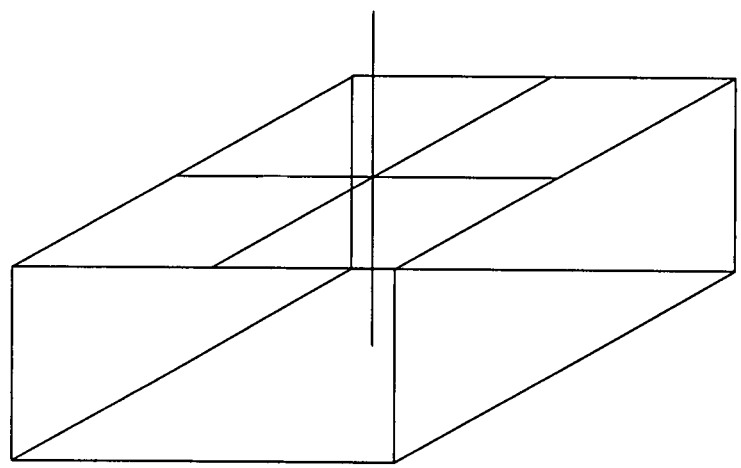
Figure 71:
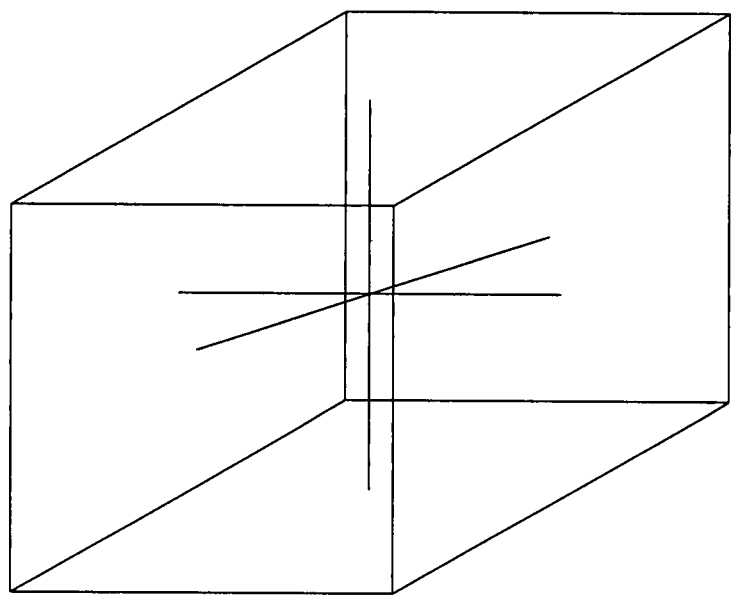

When the user fails to input additional selections or criteria for a period of time, a grazing routine relaxes the current criteria-defined sub-population, resulting in the current sub-population increasing in volume back towards the volume that encompasses the entire population of data objects within the data library. FIGS. 7A-I illustrate changes in a current sub-population resulting from user input and from automatic data-object-selection-criteria relaxation due to user inactivity according to various embodiments of the present invention. FIG. 7A shows an initial starting point represented by a volume in 3-dimensional data-object space that includes all data objects within a data library 702. Initially, the grazing routine selects data objects from the initial volume 702 for input to the presentation routine, which displays the selected data objects in a continuing, scrolling fashion as described above with reference to FIGS. 6A-F. If a user inputs a mouse click, or provides some other input, to express interest in a particular displayed image, the grazing routine may use attributes that characterize the user-selected image to update the user's profile that defines the current sub-population. Thus, as shown in FIG. 7B, user selection of an image has resulted in the sub-population shrinking from the entire 3-dimensional volume shown in FIG. 702 to one-half of the volume 704 that includes the positive first axis 706. Additional user selections or input successively shrinks the sub-population to one-quarter the size 708, as shown in FIG. 7C, and one-eighth the original size 710, as shown in FIG. 7D. Finally, as shown in FIG. 7E, additional user input has resulted in a current sub-population 712 that contains only a very small fraction of the data objects within the data-object library. Should the user fail to provide additional input, the grazing routine slowly relaxes the constraints stored in the user's profile. Thus, the small selected volume 712 is successively expanded, by the grazing routine, to ever-larger volumes of the 3-dimensional data-object space as illustrated in FIGS. 7F-H. If the user fails to again interact with the presentation routine, then the current sub-population finally increases back to the entire population of data objects within the data-object library, as shown in FIG. 7I. Although the sub-population-describing volume is shown as increasing or decreasing by a factor of 2 in FIGS. 7A-I, the actual factor may be 10, 100, or greater in high-dimensional data-object spaces, and may be controllable as a grazing-routine parameter.

The grazing routine may select data objects from the current sub-population for presentation by a variety of different techniques. The data objects may be selected randomly, sequentially, or in some structured fashion to, for example, eventually present all data objects within the sub-population, present a subset of data objects representative of the sub-population, present data objects most often viewed or displayed, display data objects nearest the center in n-dimensional space of the selected population, or by other criteria. Data objects may not necessarily be evenly distributed within sub-volumes of n-dimensional space, or evenly distributed across nodes of hierarchical data-object classifications, and therefore data-object selection methods may need to estimate or ascertain the actual distribution of data objects in order to select representative data objects over a period of time.

Figure 8:
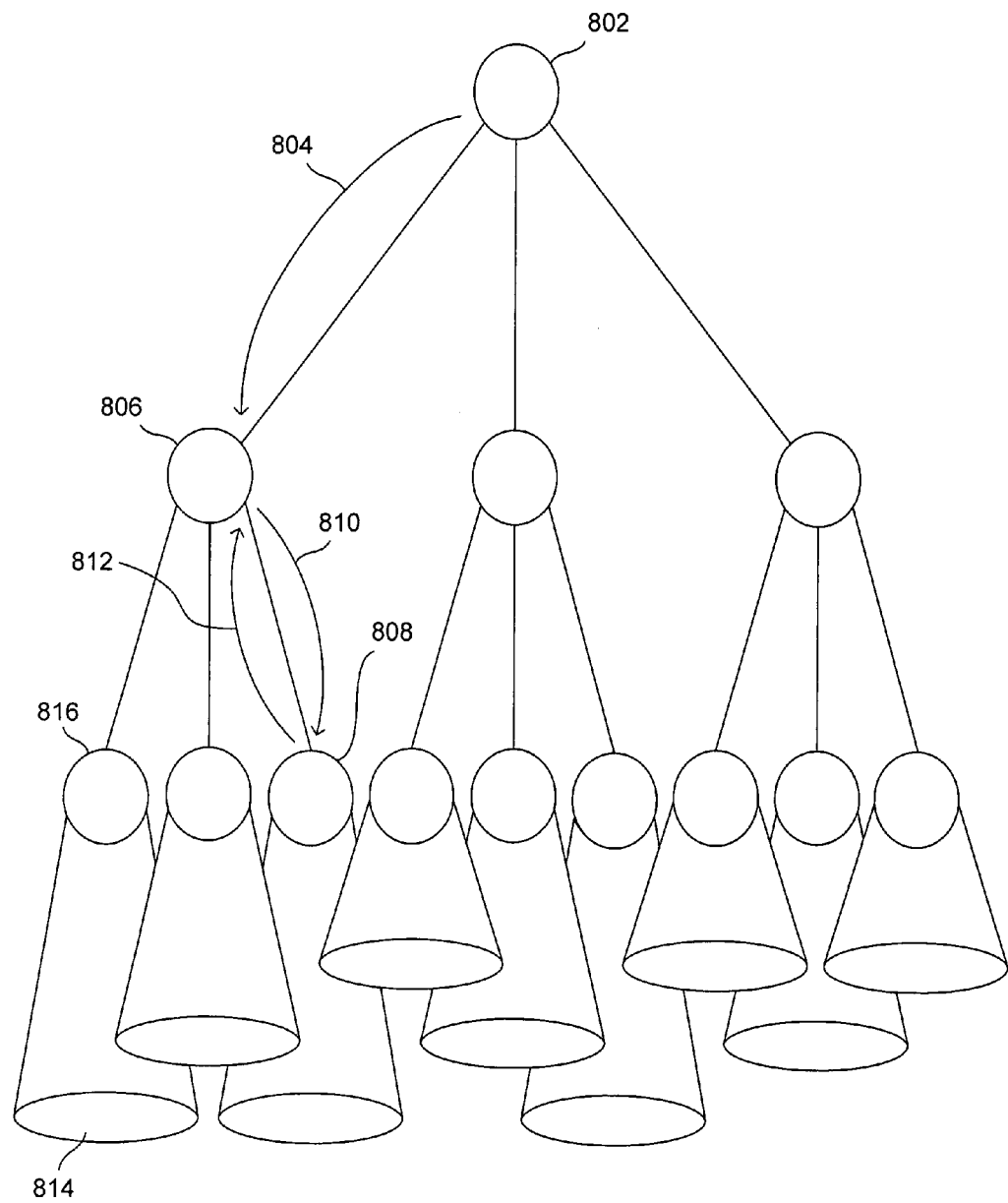
FIG. 8 shows a hierarchical classification scheme by which data objects may be classified.

Although a Cartesian, n-dimensional data-object space is a convenient representation of the sub-population selection method employed in various embodiments of the present invention, other representations are possible. FIG. 8 shows a hierarchical classification scheme by which data objects may be classified. In FIG. 8, a root node 802 represents an entire population of data objects within a data-object library. When a particular selection is made, represented by arrow 804 in FIG. 8, a sub-population of data objects, represented by node 806, is obtained that encompasses a much smaller number of data objects than encompassed by the root node 802. Specification of an additional attribute, or selection of a particular image from the sub-population of images represented by node 806, may result in a still smaller sub-population represented by node 808, with the transition from node 806 to node 808 represented by arrow 810. Relaxation of the constraints that define the sub-population, represented by arrow 812, moves the current sub-population back upward in the hierarchy to a higher-level node. The cones in FIG. 8, such as cone 814 emanating from node 816, represent subtrees below the lowest level of nodes shown in FIG. 8. In such representations, any particular node may have as many links emanating from the node to lower-level nodes as there are possible different selections based on the current sub-population represented by the node.

Figure 9B:
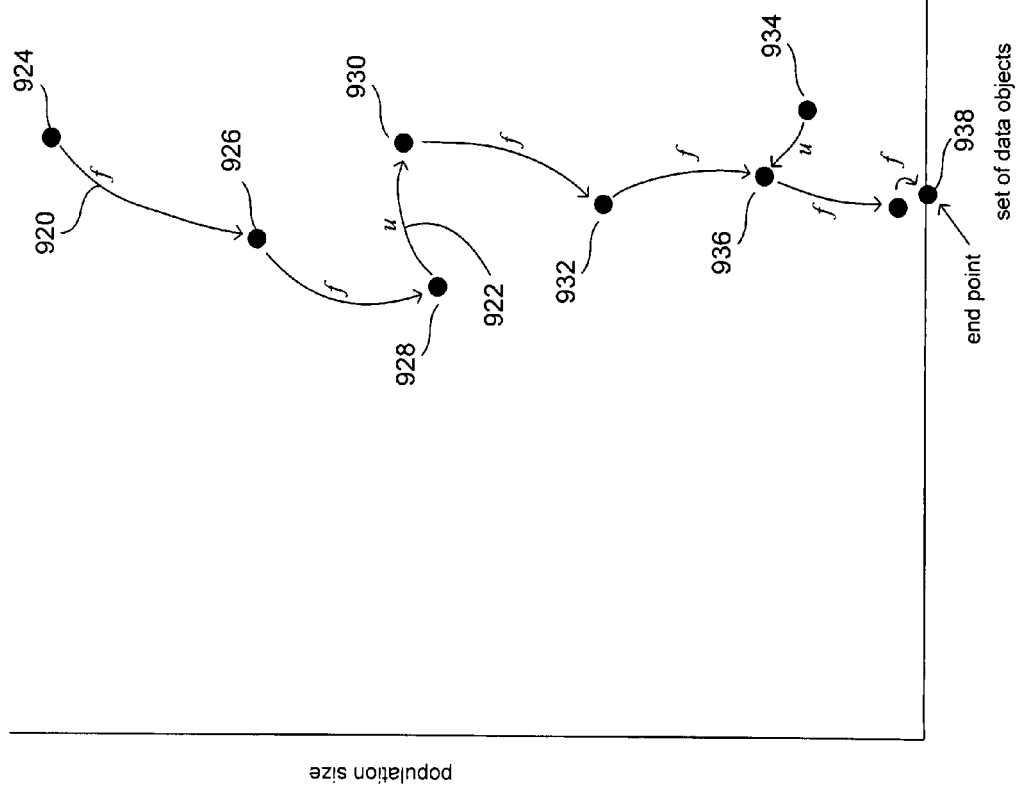

FIGS. 9A-D illustrate typical user searches conducted by using various embodiments of the present invention. In FIG. 9A, the space of possible directed searches of a population of data objects within a data-object library is represented as a 2-dimensional plane. The first dimension, represented by axis 902, includes all of the data objects within the data-object library. Line segments along the axis represent sub-populations of the data objects. For example, the line segment 904 represents a sub-population of data objects within the total population of data objects represented by the line segment from the origin 903 to point 906. The second dimension, represented by a second axis 905, corresponds to the sub-population size, or to a percentage of data objects in a sub-population with respect to the total population size. Points on the 2-dimensional plane, such as point 908, represent search states. For example, point 908 is a convenient starting search state in which all data objects within a data-object library are contained within the current sub-population, or in which the current sub-population equals the total population. The current sub-population for a particular point, or search state, is represented by the line segment on the first axis subtended by a fixed angle φ 910. For example, in search state 912, line segment 914 represents the ratio of the sub-population considered in search state 912 to the total population, or total size of the data-object library. Thus, as search states more closely approach the first axis 902, the sub-populations from which data objects are selected in the search state grow increasingly smaller. Of course, the data-objects are not actually sequentially ordered with respect to the first axis 902, but may occur in different orders depending on the criteria that define particular search states.

FIG. 9B illustrates a typical search that may be carried out by a user of various method and system embodiments of the present invention. Downward transitions represented by curved arrows labeled "f," such as arrow 920, represent forced transitions in which a user inputs a data-object selection or other input that results in narrowing of the current sub-population size, and upward-pointing curved arrows labeled "u," such as arrow 922, represent unforced transitions in which the grazing routine, due to user inactivity, automatically expands the current sub-population size by relaxing the criteria by which the current sub-population is defined. Initially, the search begins at a starting point 924. As the grazing routine selects data objects for display from the current sub-population, and as the user inputs selections or other types of input, forced transitions carry the search downward to search states 926 and 928 with ever-decreasing sub-population sizes. A period of user inactivity may result in an unforced transition 922 to a search state 930 with a somewhat larger sub-population size, from which additional user input leads, through forced transitions, to subsequent search states 932 and 934 with decreasing sub-population sizes. Another period of user inactivity may lead to a slight, automatic increase in sub-population size at search state 936, and additional user input may lead through forced transitions to a final end point 938 representing a single data object.

Although, for searching tasks, forced transitions are often to considered to decrease the size of the current sub-population from which data objects are selected for presentation, user input may also, in various embodiments, increase sub-population size or have no effect on sub-population, but instead change the data-objects within the sub-population by changing the criteria that define the sub-population to select a different, equally populated sub-volume from n-dimensional data-object space. User input may even fix the current sub-population for some period of time, to disable unforced transitions.

Figure 9C:
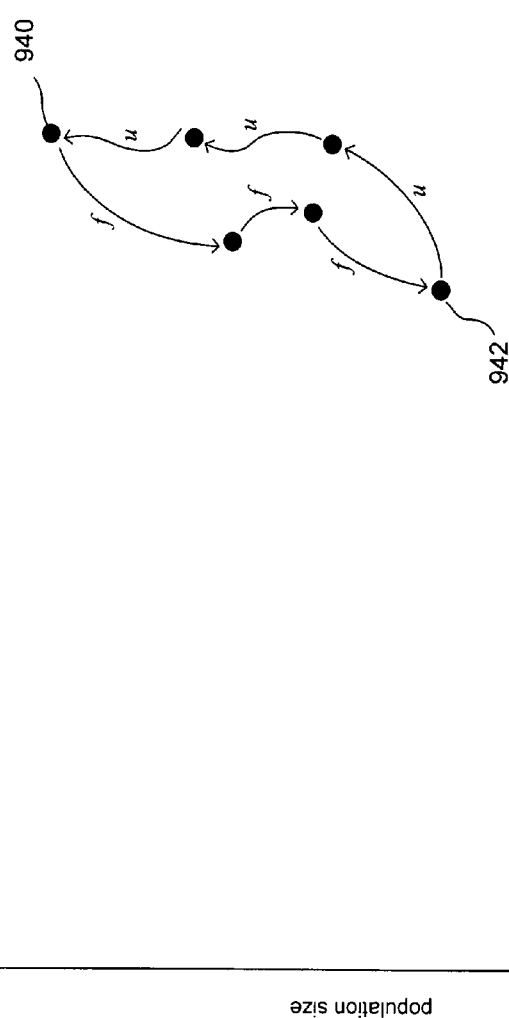
Figure 9D:
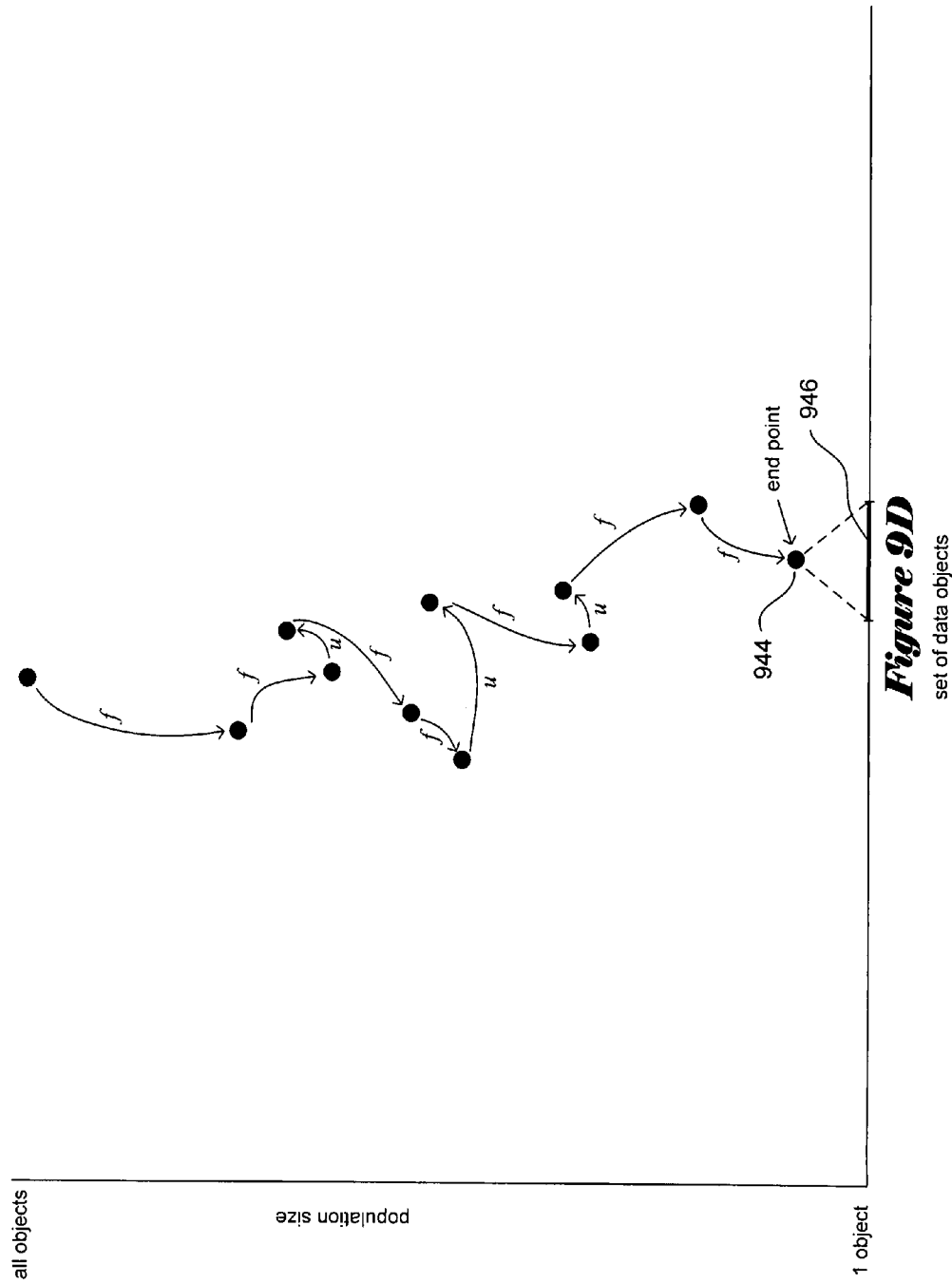

As shown in FIG. 9C, searches may not necessarily lead to results. In the search shown in FIG. 9C, three forced transitions lead from a starting point 940 to an intermediate point 942 at which this current sub-population has been significantly narrowed. However, because of user inactivity, unforced transitions lead back to the initial starting point 940. As shown in FIG. 9D, a search may not lead to a single data object, but may instead lead to an end point 944 at which the current sub-population includes a set of data objects represented by line segment 946 in FIG. 9D. Similarly, starting points need not be search states that encompass the entire population of data objects, but may instead encompass only a portion of the data objects according to certain pre-defined or inferred user preferences based on past user behavior. Once a user has found one or a set of desired data objects, the user may print the data objects, store the data objects in directories, input the data objects to any of various application programs, or otherwise use the data objects by additional, non-navigational input.

Figure 10:
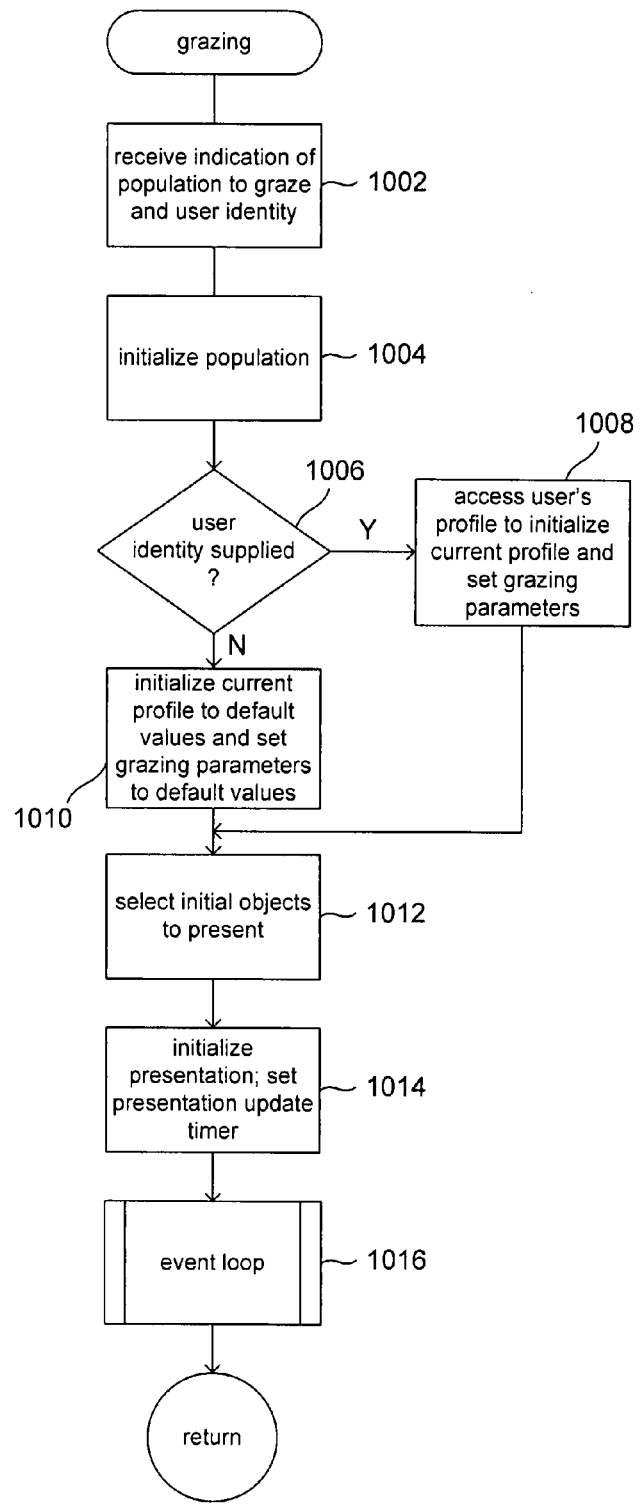
FIGS. 10-11 provide control-flow diagrams for a grazing routine that represents one embodiment of the present invention.
Figure 11:
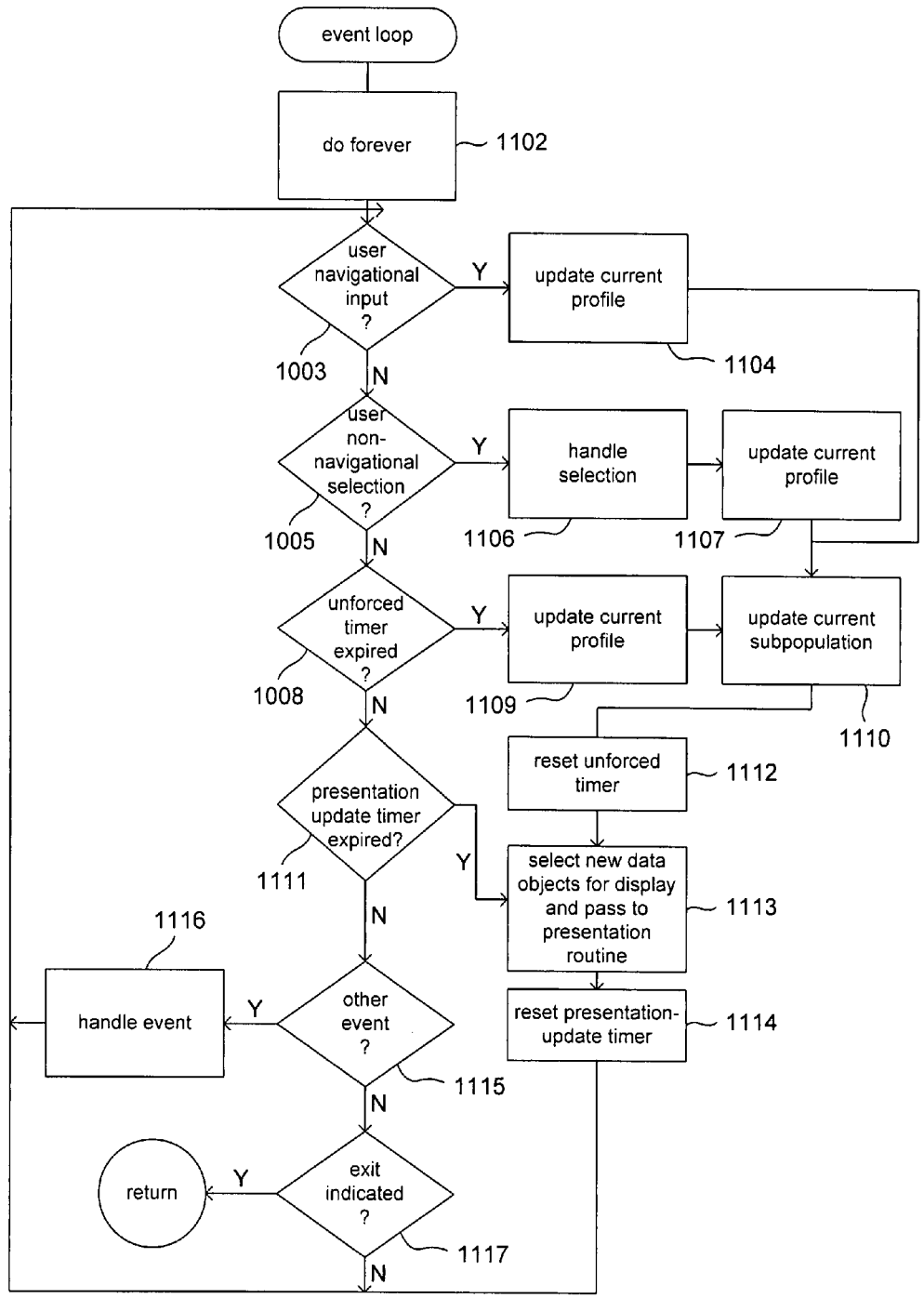

FIGS. 10-11 provide control-flow diagrams for a grazing routine that represents one embodiment of the present invention. As shown in FIG. 10, the grazing routine, in step 1002, receives an indication of the data-object library, or population, that is to be grazed, or browsed and searched, by a user, as well as an individuation of the user's identity. In step 1004, the grazing routine initializes the population of data objects. If a valid user identity was supplied in step 1002, as determined in step 1006, then the user's profile is accessed and a current profile is initialized based on the user's profile in step 1008. Otherwise, default values are used to initialize the current profile in step 1010. In addition to initializing the current profile, various grazing-application parameters and characteristics can be set and defined according either to values residing in a user's profile or default values in steps 1008 and 1010. Next, in step 1012, the grazing routine selects an initial starting point for the search, selects an initial sub-population corresponding to the starting point, and selects an initial set of data objects from the current sub-population for presentation to the presentation routine. In step 1014, the grazing routine initializes the presentation routine, inputting the data objects selected in step 1012, and sets a presentation-update timer to a desired presentation-update time interval. Finally, in step 1016, the grazing routine enters a continuously iterating event loop.

FIG. 11 shows the grazing-application event loop. The grazing-application event loop is a do forever loop comprising steps 1102-1117 that continuously iterates until an exit condition arises. In each iteration of the do forever loop, the grazing-application event loop determines, in step 1103, whether the user has input a navigational input, such as a data-object selection input. If so, then the event loop updates the current profile, in step 1104, updates the current sub-population based on the updated profile in step 1110, resets an unforced-transition timer, in step 1112, selects data objects from the new current sub-population for presentation to the presentation routine, in step 1113, and resets the presentation-update timer to a desired interval for adding new data objects in step 1114.

The unforced-transition timer is set, in step 1112, to the minimum time of user inactivity for generating an automatic data-object sub-population expansion, as discussed above. In step 113, the data objects are selected by any of various types of selection methods, as discussed above, and are passed to the presentation routine to allow the presentation routine to schedule addition of the selected data objects to the logical presentation display area for eventual display and viewing by a user. In certain embodiments, the grazing routine may command the presentation routine to add data objects and translate the display window, while, in alternative embodiments, the presentation routine may run asynchronously, and update the logical presentation display area, translate the display window, and arrange for rendering of the contents of the display window by a display or presentation device according to internal presentation-routine parameters and timers.

When the event loop determines that a non-navigational user input or selection has been input, in step 1105, then the event loop invokes a handler appropriate for the input or selection, in step 1106, updates the current profile, if necessary, in step 1107, updates the current sub-population, selects data objects from the current sub-population, and resets the unforced and presentation-update timers in steps 1110-1114. If, as determined in step 1108, the event loop determines that the unforced-transition timer has expired, then, in step 1109, the event loop updates the current profile to relax the criteria by which the current sub-population is defined, updates the current sub-population in step 1110 according to the new constraints, resets the unforced-transition timer, in step 1112, selects data objects from the new current sub-population for presentation to the presentation routine, in step 1113, and resets the presentation-update timer to a desired interval for adding new data objects in step 1114. If, on the other hand, the event loop determines that the presentation-update timer has expired, as determined in step 1111, then the event loop selects new data objects from the current sub-population, in step 1113, and resets the presentation-update timer in step 1114. If the event loop determines that some other event has occurred, in step 1115, then an event handler appropriate for that event is called, in step 1116. Finally, if the event loop determines that an event that should cause the event loop to terminate has occurred, in step 1116, then the event loop terminates.

Object-Selection Embodiments of the Present Invention

Embodiments of the present invention are directed to a method for selecting data objects from a database of data objects to form the current subpopulation of data objects from which data objects are selected for display, as part of a grazing application, discussed above. In other words, object-selection embodiments of the present invention are directed to step 1110 in FIG. 11, and to similar steps in alternative grazing applications.

Figure 12:
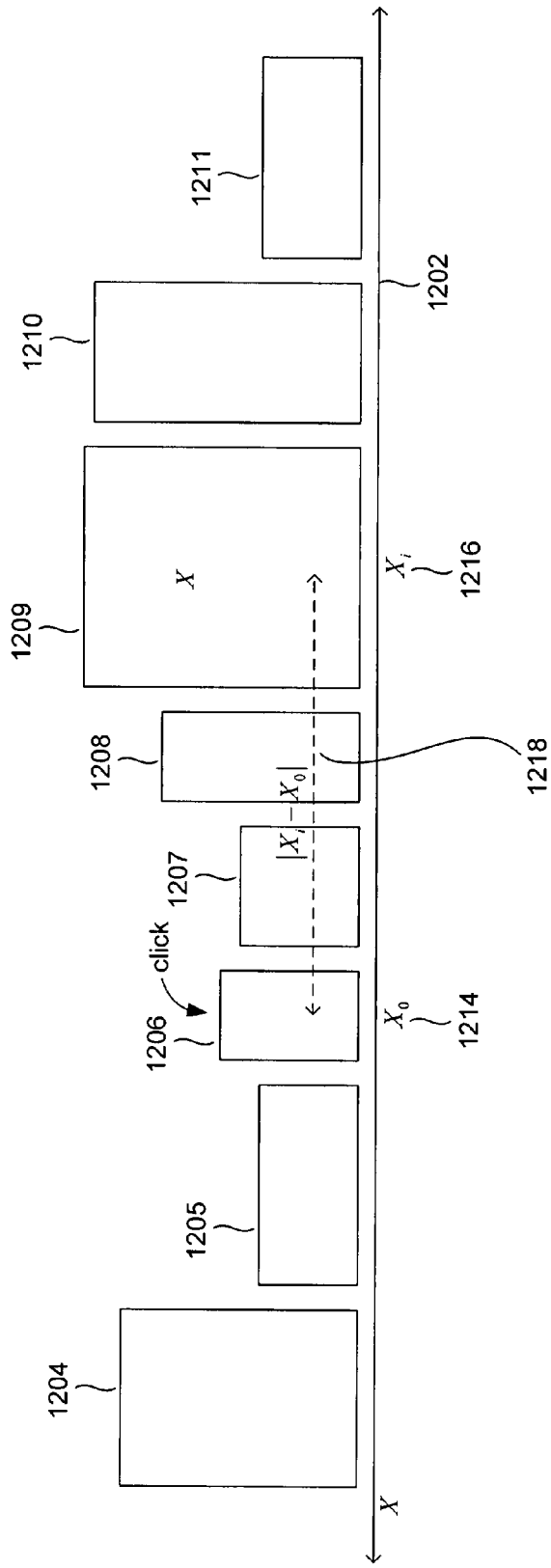
FIG. 12 illustrates ordering of data objects with respect to a selection-criterion x according to an embodiment of the present invention.

FIG. 12 illustrates ordering of data objects with respect to a selection-criterion x according to an embodiment of the present invention. In FIG. 12, the selection-criterion x is plotted along a horizontal axis 1202. Various data objects 1204-1211 are shown in FIG. 12 ordered with respect to selection-criterion x, along the x axis 1202. An assumption, in certain of the method embodiments of the present invention, is that, once ordered by selection-criterion x, the relatedness of an object to a selected object is proportional to the distance along the x axis that separates the two objects. Thus, for example, as shown in FIG. 12, a selected object 1206 with selection-criterion-value "$x_0$" 1214 is separated from object 1209 with selection-criterion-value "$x_i$" 1216 by the distance $|x_i-x_0|$ 1218, shown in FIG. 12 as the absolute value of the difference between the selection criteria for the two objects as well as by a dashed, double-headed arrow in FIG. 12. When a given object has been selected by a user, objects potentially related, in user interest, to that object may be found using the metric $|x_i-x_0|$, a relative selection-criterion value for other objects i with respect to a previously user-selected object with selection-criterion-value "$x_0$." The object-selection method embodiments of the present invention assume that objects with selection-criterion values close to those of recently selected objects are more likely to also be of interest to a user than objects with selection-criterion values further away from the selection-criterion values of recently selected objects. There is no guarantee that objects within a neighborhood, with respect to the selection-criterion-value axis, of a recently selected object are, in fact, of interest to a user. Thus, although, strictly speaking, the probability distributions discussed below express the probabilities that objects will be selected for display to a user by the grazing application, given recent object selections by a user, and given the selection-criterion-value assignments made to the objects in a population of objects from which object selections are made, these probability distributions are referred to as expressing or representing the probabilities that objects are potentially of interest to a user.

It should be noted that, in the current discussion, selection events are described as involving user selection of an object. As discussed in the previous subsection, additional types of events may contribute to object selection. In general, the phrases "user selection of objects" and "user-selected object" refer to any of a number of different types of user interaction that result in a particular object designated as being potentially of interest to a user.

It should also be noted that the assignment of selection-criterion values may be based on any number of different considerations and object characteristics and features. For example, the selection-criterion values may be scores, or metrics, based on object meta data. In the case that the objects are images, for example, the selection criterion may be a composite metric computed based on brightness and variability of color within the image and color or brightness gradients computed at selected points within the image. When image-interpretation programs are available, such programs may be called to return a collection of characteristics that can be mathematically combined to produce a single value within a range of possible metric values.

Figure 13A:
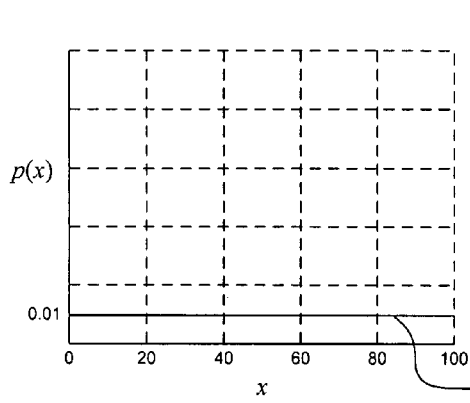
FIGS. 13A-E illustrate desirable properties of probability distributions that represent the probabilities of data objects with selection-criteria values x being potentially of interest to a user at points in time subsequent to user inputs specifying interest in a particular object, according to one embodiment of the present invention.
Figure 13B:
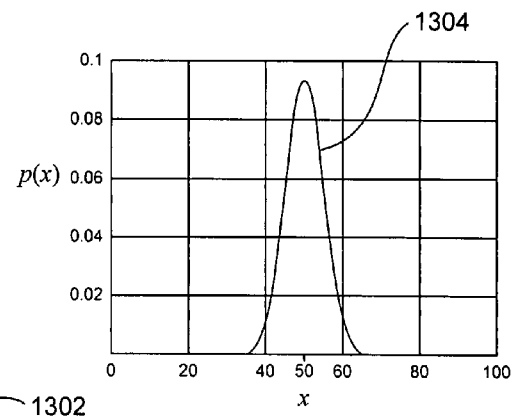

FIGS. 13A-E illustrate desirable properties of probability distributions that represent the probabilities of data objects with selection-criteria values x being potentially of interest to a user at points in time subsequent to user inputs specifying interest in a particular object, according to one embodiment of the present invention. In each of FIGS. 13A-E, and in FIGS. 14A-E, described below, the probability that a data object associated with selection-criterion value x is potentially of interest to a user, p(x), is plotted with respect to a vertical axis p(x) and a horizontal axis x. First, consider an initial state of a grazing application, prior to a user selecting a particular presented object. In that case, as shown in FIG. 13A, the probability distribution 1302 is flat. In all of FIGS. 13A-14E, the probability distributions are normalized, so that the area below the probability distribution is 1.0. When a user selects a first object, the probability distribution immediately reflects a high probability of the selected object potentially being of interest to the user. FIG. 13B shows the probability distribution following selection, by a user, of a data object with selection-criterion value x equal to 50. The resulting probability distribution 1304 is Gaussian shaped, with mean at 50 and with a relatively small variance. In other words, the selected object, and all other objects with selection-criterion values close to the selected object, have high probabilities of being potentially of interest to the user.

Figure 13C:
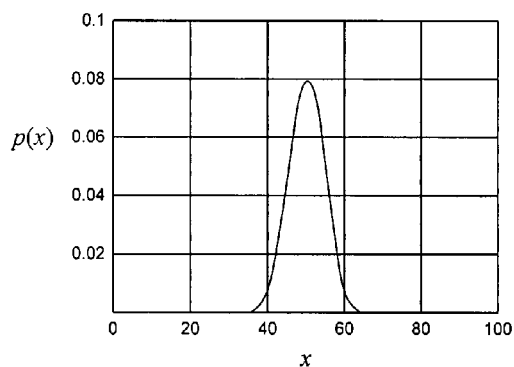
Figure 13D:
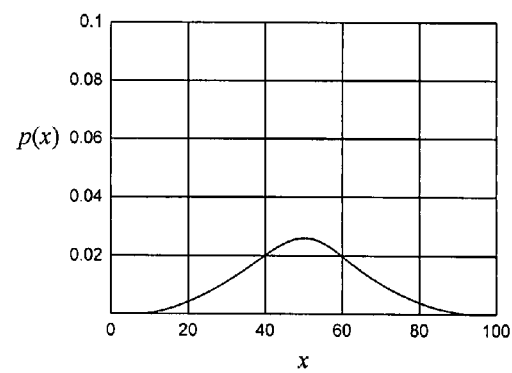
Figure 13E:
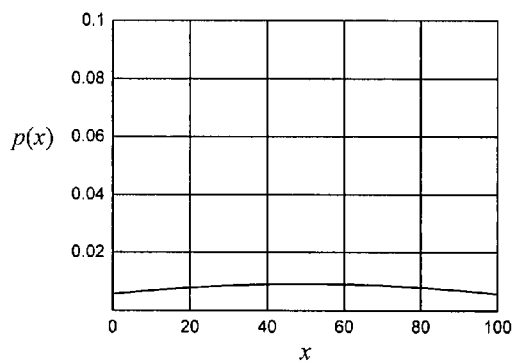

As shown in FIGS. 13C-E, if the user selects no additional objects, then the variance of the probability distribution increases with time. The probabilities that objects, with selection-criterion values close to that of the previously selected object, are potentially of interest to the user decrease, over time, while the probabilities of objects with selection-criterion values relatively far removed from the selection-criterion value of the previously selected object steadily increase, over time. FIG. 13C shows the probability distribution ten seconds after the user's selection, FIG. 13D shows the probability distribution 100 seconds after the user's selection, and FIG. 13E shows the probability distribution 200 seconds after the user's selection. Eventually, after a sufficient period of time, the probability distribution returns to that shown in FIG. 13A, without additional user input.

Figure 14A:
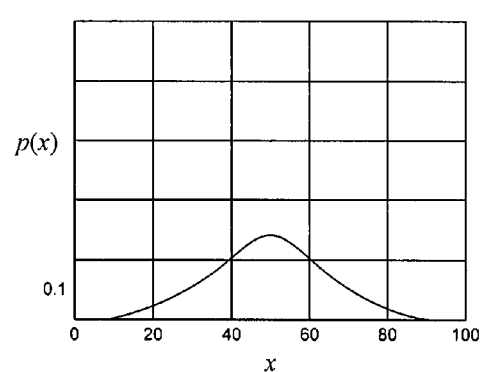
FIGS. 14A-E illustrate the probability distributions of the probability of data objects with selection-criteria values x being potentially of interest to a user when additional user selections occur, according to one embodiment of the present invention.
Figure 14B:
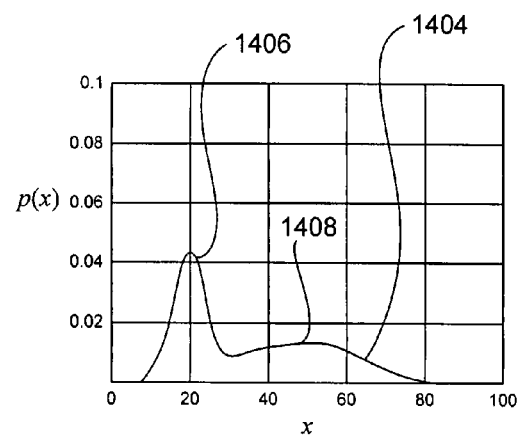
Figure 14C:
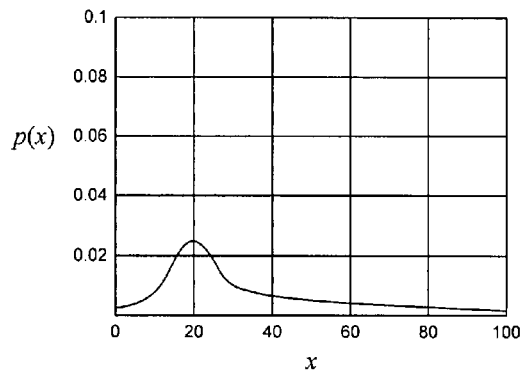
Figure 14D:
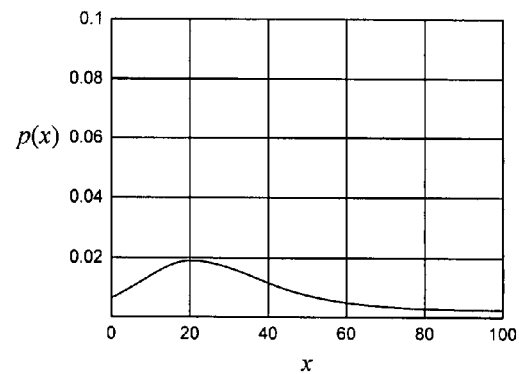
Figure 14E:
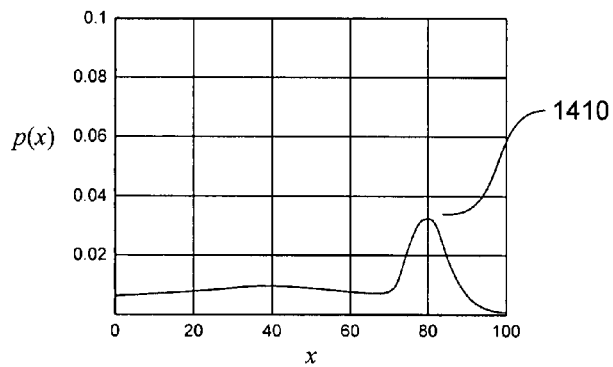

FIGS. 14A-E illustrate the probability distributions of the probability of data objects with selection-criteria values x being potentially of interest to a user when additional user selections occur, according to one embodiment of the present invention. FIG. 14A shows the probability distribution following the elapse of 200 seconds after the selection, by a user, of a data object with selection-criterion value 50, as previously shown in FIG. 13D. However, as shown in FIG. 14B, the user, at this point in time, selects a second data object with selection-criterion value 20. The probability distribution 1404 is now bimodal, with a relatively low-variance component distribution 1406 with mean at x=20 and a high-variance component distribution 1408 with mean at x=50. Again, without additional user input, the variance of each component distribution within the total probability distribution continues to increase. FIG. 14C shows the probability distribution for the two-selection case after elapse of an additional 50 seconds, and FIG. 14D shows the probability distribution after an elapse of 100 seconds following the second object selection by the user. If the user makes a third selection, at the point in time illustrated in FIG. 14D, then the tri-modal probability distribution shown in FIG. 14E obtains. In the case shown in FIG. 14E, the user has selected a data object with selection-criterion value x=80, resulting in a low-variance component distribution 1410 centered at the x value 80. Although this distribution is tri-modal, the distribution appears bimodal, in FIG. 14E, since the variances of the first two component probability distributions corresponding to the first two selections have increased to the point that the separate, two peaks appear to have merged. Thus, as shown in FIGS. 13A-14E, the total probability distribution for objects being of potential interest to a user continuously evolves, over time.

Provided that it is possible to compute the probabilities of data objects being potentially of interest to a user based on a multi-component probability distribution, with each component corresponding to a recent user selection of a data object, then selection of data objects for subpopulations, in step 1110 of FIG. 11, is straightforward.

Figure 15:
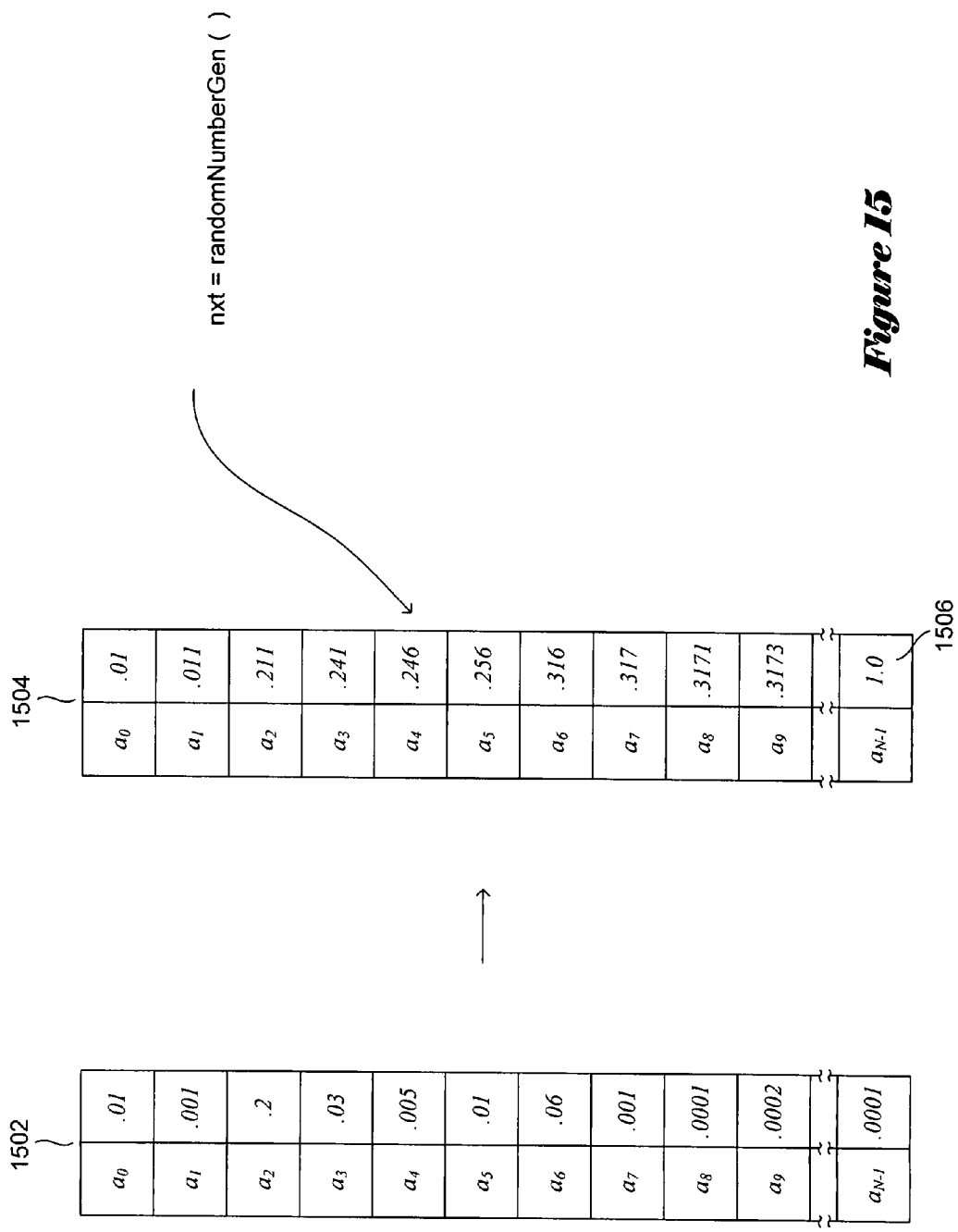
FIG. 15 illustrates one subpopulation-selection method that represents an embodiment of the present invention.

FIG. 15 illustrates one subpopulation-selection method that represents an embodiment of the present invention. In FIG. 15, a first table 1502 lists each data object in a database, $a_0, a_1, \ldots a_{N-1}$, along with a corresponding probability that the object is potentially of interest to the user. As discussed with reference to FIGS. 13A-E, the probabilities are normalized, so that the sum of all of the probabilities of all of the data objects equals 1.0. Table 1502 is readily transformed to the state shown as Table 1504 in FIG. 15. In this transformation, rather than pairing each data object with its separate probability being potentially of interest to a user, the value associated with a given data object is the sum of the probabilities of all data objects prior to and including the given data object in the table. Thus, for example, in Table 1504, data object $a_0$ has the cumulative probability 0.01, identical to its probability of being potentially of interest to a user, as shown in FIG. 1502, since data object $a_0$ is the first data object in Table 1504. However, value associated with each subsequent data object represent the sum of all probabilities in Table 1502 for data objects up to and including that data object. The final value 1506 in Table 1504 is 1.0, since, as mentioned above, the sum of all of the probabilities for all of the data object equals 1.0. Given a random-number generator or pseudo-random-number generator that returns a random number between 0.0 and 1.0, data objects can be randomly selected according to their probabilities of being potentially of interest to a user by using the number nxt returned from the random-number generator as an index into Table 1504. For example, the value nxt can be used to select a data object $a_i$ such that the cumulative probability value $p_i$ associated with $a_i$ is less than or equal to nxt and greater than the cumulative probability value $p_{i-1}$ for data object i-1 in Table 1504:

$$p_{i-1} < nxt \le p_i.$$

Many alternative methods of using a random-number generator or pseudo-random-number to randomly select objects with selection probabilities corresponding to their associated probabilities of being potentially of interest to a user are possible. The grazing method described with reference to control-flow diagrams in FIGS. 10-11 can be modified to employ certain embodiments of the present invention by computing probabilities that data objects are of interest and using a random number generator to select data objects with selection probabilities corresponding to their probabilities of interest.

Figure 16:
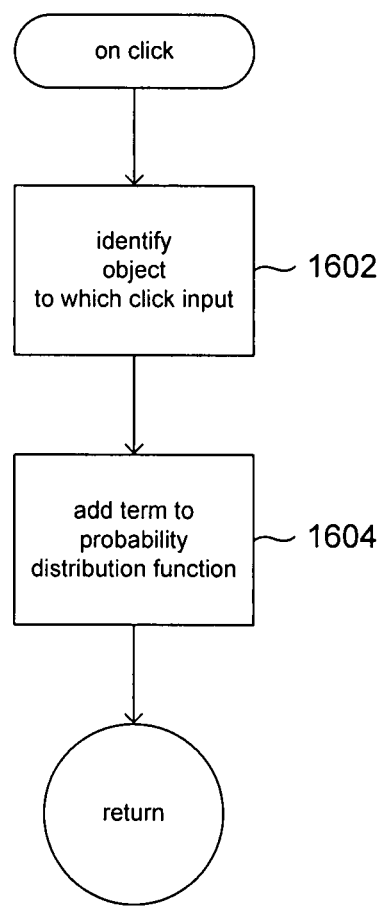
FIG. 16 shows a control-flow diagram that describes additional steps needed to practice the method of the present invention when a user selects a particular data object, according to one embodiment of the present invention.

FIG. 16 shows a control-flow diagram that describes additional steps needed to practice the method of the present invention when a user selects a particular data object, according to one embodiment of the present invention. Upon selection of a data object by the user, the data object selected is identified, in step 1602, and a term is added to the multi-component probability distribution function in step 1604. The term reflects an additional component distribution corresponding to the user selection, as discussed above with reference to FIGS. 13A-14E.

Figure 17:
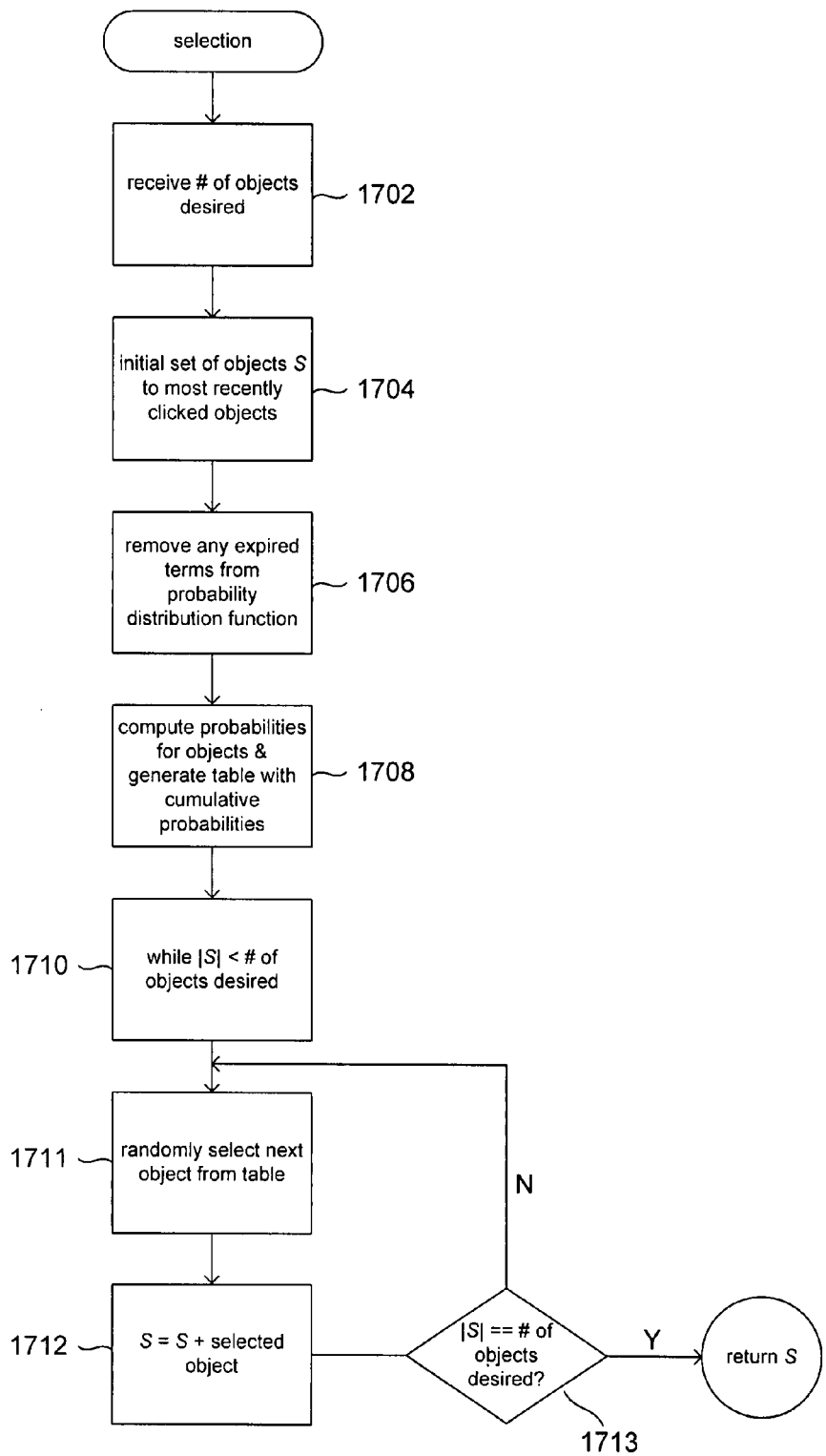
FIG. 17 is a control-flow diagram illustrating the selection method that represents one embodiment of the present invention.

FIG. 17 is a control-flow diagram illustrating the selection method that represents one embodiment of the present invention. In step 1702, the routine "selection" receives the number of data objects desired in a subpopulation. In optional step 1704, data objects corresponding to the most recently selected data objects may be used to initialize the set S representing the subpopulation selected by the routine "selection." Alternatively, the set S may be set to the null set. In step 1706, component distributions in the probability distribution function that have expired, where a component distribution expires when the variance of the component distribution increases to the point that the component distribution no longer contributes to differentiating the probabilities that data objects are potentially of interest to the user. Expiration of a term may be identified by the time elapsed since the event occurred, may be based on comparing the variance or standard deviation of the component distribution to a threshold value, or may be identified by other such means Then, in step 1708, probabilities for the data objects in the database are computed to generate a table of cumulative probability distributions, discussed above with reference to Table 1504 in FIG. 15. In the while-loop of step 1710-1713, the random number generator is used to select a next data object from the table of cumulative probabilities, as discussed above with reference to FIG. 15, and the selected data object is then added, in step 1712, to set S, according to set addition, in which only objects not already included in set S, until set S includes the desired number of data objects, as determined in step 1713.

There are many possible ways of generating a multi-component probability distribution function with the characteristics discussed above with reference to FIGS. 13A-14E. One such probability distribution is described below, but many others are possible. The probability distribution can be expressed as:

$$p_i = \frac{1}{K} \sum_{k=1}^{K} \beta_{k,i} e^{\frac{-(x_i - x_k)^2}{\gamma_{k,i}}} \bigg/ \eta_k$$

where $p_i$ is the probability of object i being potentially of interest to a user;

K is the number of non-expired user-selection events, or components;

$\beta_{k,i}$ is a coefficient that depends on an amount of time elapsed since the $k^{th}$ user-selection event occurred;

$\gamma_{k,i}$ is a coefficient that depends on an amount of time elapsed since the $k^{th}$ user-selection event occurred; and $\eta_k$ is a normalization coefficient for the $k^{th}$-component probability distribution.

Each component k is separately normalized by a normalization term $\eta_k$, and the entire distribution is normalized by the coefficient $$\frac{1}{K}.$$

The normalization term for the $k^{th}$ term is expressed as:

$$\eta_k = \sum_{n=1}^{N} \beta_{k,n} e^{\frac{-(x_n - x_k)^2}{\gamma_{k,n}}}$$

where N is equal to the total number of objects. In other words, each component distribution is divided by the sum of probabilities of all data objects with respect to the $k^{th}$ component distribution to normalize the component distribution.

The coefficient $\beta_{k,i}$ may be expressed as:

$$\beta_{k,i} = \frac{1}{\sqrt{4\pi D t_{k,i}}}$$

where $t_{k,i}$ is related to elapsed time since event k, as discussed below; and $$D \cong \frac{x_{max} - x_{min}}{N}.$$

The term $\gamma_{k,i}$ may be expressed as:

$$\beta_{k,i} = 4Dt_{k,i}$$

The term $t_{k,i}$, which appears in the expressions for $\beta_{k,i}$ and $\gamma_{k,i}$, may be expressed as:

$$t_{k,i} = A^{\frac{t_k}{60}} + I_{k,i}$$

where $$\log(A) = \frac{1}{10}(\log(N^2) - 2);$$

and $I_{k,i}$ is discussed below.

The term $t_{k,i}$ is a scaled, shifted time value related to the elapsed time since the selection event k has occurred. The elapsed time since occurrence of selection event k is scaled in order to provide a logarithmic variance relaxation for component distributions within the probability distribution with respect to time. The constant coefficients in this term depend on assumptions concerning the time at which total relaxation to a uniform, constant probability distribution should have occurred, for a given component probability distribution, and additional assumptions. As with other constant coefficients in the expressions related to the total probability distribution, discussed above and below, these constant coefficients may be varied to achieve a desired object-selection behavior, and with respect to characteristics and features of particular grazing applications in which the object-selection method embodiments of the present invention are employed. Finally, the shift factor $I_{k,i}$ is provided:

$$I_{k,i} = \frac{1}{8\pi D p_{k-1}^2(i)}$$

The shift factor $I_{k,1}$ is used to initialize the variance of a component probability distribution within the component probability distribution related to event k, so that the variance is initially modest, but sufficient to include a reasonable number of data objects about the selected data object, but is decreased in proportion to the number of recent, prior selections of data objects correlated with data object i. The shift factor is computed for an event k once, when the component distribution for event k is added to the total probability distribution, and remains fixed until the component distribution expires, and is removed from the total probability distribution.

The above-described probability distribution is derived from the diffusion equation, the solution to which is given by:

$$p(x, t) = \frac{1}{\sqrt{4\pi Dt}} e^{\frac{-x^2}{4Dt}}$$

where p(x,t) is the probability that an object is potentially of interest to the user;

x is a one-dimensional position;

t is time; and

D is the diffusion coefficient.

As discussed above, the assumption leading to the component probability distributions is that, when a user selects an object $x_0$, other objects close in proximity to the selected object, as measured by differences in the selection-criterion values of the other objects and the selected object, may also be of interest. Thus, the relative selection criterion value $|x_i - x_0|$ is a measure of closeness, or distance, between objects with associated selection-criterion values $x_0$ and $x_i$, and the probability distribution becomes:

$$p_i(x_i, t) = \frac{1}{\sqrt{4\pi Dt}} e^{\frac{-(x_i - x_0)^2}{4Dt}}$$

where t is defined as the time since the user made the selection of the object associated with selection-criterion value $x_0$. As discussed above, the probabilities are normalized, so that:

$$\Sigma_i p_i(x_i, t) = 1$$

The standard diffusion equation yields a standard deviation of:

$$\sigma(t) = \sqrt{2Dt}$$

The number of objects in a subpopulation of objects with reasonably high probabilities of being potentially of interest to a user at time t, n(t), can be inferred to be proportional to the standard deviation:

$$n(t) \propto \sigma(t)$$

Using elapsed time, the variance of the probability distribution decreases extremely rapidly, initially, and then increasingly slower, so that return of the probability distribution to the flat probability distribution shown in FIG. 13A would take an extremely long period of time. In order to adjust the rate of increase in variance for a probability distribution, the elapsed time t is scaled to a scale time $t_s$ as follows:

$$t_s = A^{\frac{t_r}{60}}$$

where A is a constant; and $t_r$ is the elapsed time since occurrence of an event, in seconds. Inserting this scaled time into the previously provided equations for the standard deviation and subpopulation size, above, one obtains:

$$\sigma(t) = \sqrt{2DA^{\frac{t_r}{60}}}$$

$$\log(\eta) \propto t_r$$

Thus, the subpopulation size grows as the logarithm of the elapsed time. Assuming that it is desirable to have 100 initial objects:

$$\text{at } t_r = 0, \, 2\sigma = 100\overline{(x_i - x_{i-1})}$$

Assuming that, after 600 seconds, the probability distribution should have flattened implies:

$$\text{at } t_r = 600, \, 2\sigma \gg x_{i=N} - x_{i=0} = 10(x_{i=N} - x_{i=0})$$

Defining the span, S, of the data objects as the maximum separation in selection-criteria values of any two data objects in the database, the average distance, in selection-criterion value, between two adjacent data objects is:

$$\overline{(x_i - x_{i-1})} = \frac{S}{N}$$

Thus:

$$\frac{100S}{N} = 2\sqrt{2D}$$

$$D = \frac{\left(\frac{50S}{N}\right)^2}{2} \approx 1000\left(\frac{S}{N}\right)^2$$

$$10S = 2\sqrt{2DA^{\frac{t_r}{60}}}$$

$$\log(A) = \frac{1}{10}(\log(N^2) - 2)$$

The above derivation is related to a single event, such as user selection of a data object. When multiple events occur, the total probability distribution with respect to all of the events that have occurred, within some reasonable amount of time, is expressed as the sum of the individual distributions associated with each event:

$$p_i = \frac{1}{C}\sum_k \frac{1}{\sqrt{4\pi Dt_{s,k}}} e^{\frac{-(x_i - x_k)^2}{4Dt_{s,k}}}$$

Finally, for any given event, the scaled time for the event is modified by an added term representing an initial time for the event, with the initial time essentially broadening the distribution, or increasing the variance of the component distribution, corresponding to the event. Thus:

$$t'_{s,k} = t_{s,k} + t_{0,k}$$

where $t_{0,k}$ is the initial age or initial time for an event k. In order to factor in previous events into the variance initially associated with the component distribution for a next event, the initial age, $t_{0,k}$ is considered to be a function of the cumulative probabilities of prior selections:

$$t_{0,k} = f(p_{k-1})$$

One approach to computing $t_{0,k}$ is to assume that the probability of prior events is a result of a single prior selection of the same object. Therefore, using the basic diffusion equation:

$$p_i, (x_i - t) = \frac{1}{\sqrt{4\pi DT}} e^{\frac{-(x_i - x_0)^2}{4Dt}}$$

and assuming $x_i = x_0$, a computed value for an effective initial time $t_{\text{eff}}$ is computed as:

$$t_{\text{eff}} = \frac{1}{4\pi D p_{k-1}^2}$$

The initial age of a $k^{th}$ selection is therefore:

$$t_{0,k} = \frac{t_{\text{eff}}}{2} = \frac{1}{8\pi D p_{k-1}^2}$$

While a single selection-criterion dimension x may appear, initially, to be oppressive, there are many techniques available for dimensionality reduction to allow an intrinsically multi-dimensional selection-criteria volume to be reduced to a single dimension. However, in cases where such techniques do not provide desirable results, a multi-dimensional approach to the selection problem can be derived using the multi-dimensional diffusion equation:

$$p(x, y, t) = \left(\frac{1}{\sqrt{4\pi D_x t}} e^{\frac{-x^2}{4D_x t}}\right)\left(\frac{1}{\sqrt{4\pi D_y t}} e^{\frac{-y^2}{4D_y t}}\right)$$

where $$p(x_0, t) = \sum_y p(x_0, y, t);$$

and $$\sum_x \sum_y p(x, y, t) = 1.$$

Furthermore, in many cases, selection criteria may not be continuous, but may instead be discrete values, and the distribution of selection-criteria values may not be relatively uniform over the data objects, but may instead be quite non-uniform. In these cases, the above-described probability-distribution equation may need extensive modifications.

Although the present invention has been described in terms of particular embodiments, it is not intended that the invention be limited to these embodiments. Modifications within the spirit of the invention will be apparent to those skilled in the art. For example, an almost limitless number of different implementations of the selection methods of the present invention can be implemented using different programming languages, modular organizations, data structures, control structures, and by varying other such programming parameters. While the diffusion-equation-derived multi-component probability distribution function described above provides the desired characteristics described with reference to FIGS. 13A-14E, there are potentially an unlimited number of additional mathematical and computational approaches for describing a probability distribution with the desired characteristics. Many different parameterized probability-distribution expressions may be used, in addition to the normal distribution, and may have advantages related to the distribution of selection-criterion values of data objects. The grazing routine and presentation routine may be incorporated into a large number of different types of software applications and systems. In particular, the criteria for sub-population definition that are refined by user input to narrow the sub-population to encompass data-objects desired by a user may vary from system to system, depending on the access, characterization, and search primitives provided by the data-object library or data-object database. As discussed above, a user may employ any of a variety of non-navigational input commands to direct located data objects to other applications, to a printer, to an object-display routine, to local or remote storages, and to other such utilities and procedures. Presentations routines may present any number of different types of data objects to a user using many different presentation strategies and techniques appropriate to the type of data objects stored in the data-object library. The present invention may be applied to searching and directed browsing of many different types of data-objects and data-object libraries. For example, a movie database might be browsed by an embodiment of the present invention. Still images from movies may be displayed, which, when selected by a user, might result in display of short, video segments selected from the movie. Movies may be described by a very large number of different attributes, from the names of principle actors and actresses to date of release, subject matter, commercial success, critical reviewer's ratings, and any number of additional attributes.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for selecting a sub-population of objects from a population of objects based on user-selection events, the method comprising:
   assigning a selection-criterion value to each object in the population of objects;
   maintaining a total probability distribution, combining probability distributions associated with each non-expired user-selection event, that represents the probability of each object in the population being potentially of interest to the user based on the selection-criterion value assigned to the object; and
   randomly selecting objects from the population of objects with a selection probability for each object proportional to the probability of the object being potentially of interest to the user according to the total probability distribution.

2. The method of claim 1 wherein the selection-criterion value x, assigned to an object i is a numeric value, with the selection-criterion values for the population of object falling along a continuous selection-criteria axis between and including a smallest selection-criterion value $x_{min}$ and a largest selection-criterion value $x_{max}$.

3. The method of claim 2 wherein a relative selection criterion of an object i to a user-selected object j is $|x_i - x_j|$.

4. The method of claim 3 wherein a probability distribution associated with a non-expired user-selection event, in which the user selected object j with selection-criterion value $x_j$, is Gaussian-like, with mean $x_j$.

5. The method of claim 3 wherein the total probability distribution that represents the probability of each object in the population being potentially of interest to the user has multiple terms summed together and normalized, each term a Gaussian-like probability distribution associated with a non-expired user-selection event, in which the user selected object j with election-criterion value $x_j$.

6. The method of claim 3 wherein the total probability distribution is expressed as:

$$p_i = \frac{1}{K} \sum_{k=1}^{K} \beta_{k,i} e^{\frac{-(x_i - x_k)^2}{\gamma_{k,i}}} \Big/ \eta_k$$

where
   $p_i$ is the probability of object i being potentially of interest to a user;
   $x_i$ is the selection-criterion value associated with object i;
   $x_k$ is the selection criterion associated with object selected in the $k^{th}$ user-selection event;
   K is the number of non-expired user-selection events;
   $\beta_{k,i}$ is a coefficient that depends on an amount of time elapsed since the $k^{th}$ user-selection event occurred;
   $\gamma_{k,i}$ is a coefficient that depends on an amount of time elapsed since the $k^{th}$ user-selection event occurred; and
   $\eta_k$ is a normalization coefficient for the $k^{th}$-component probability distribution.

7. The method of claim 6 wherein the normalization coefficient for the $k^{th}$-component probability distribution is:

$$\eta_K = \sum_{n=1}^{N} \beta_{k,n} e^{\frac{-(x_n - x_k)^2}{\gamma_{k,n}}}$$

computed over all objects N.

8. The method of claim 7 wherein the coefficients $\gamma_{k,i}$ and $\beta_{k,i}$ are expressed as:

$$\beta_{k,i} = \frac{1}{\sqrt{4\pi D t_{k,i}}}$$

$$\gamma_{k,i} = 4D t_{k,i}$$

where $$D \cong \frac{x_{max} - x_{min}}{N};$$

and $t_{k,i}$ is related to the time elapsed since the $k^{th}$ user-selection event occurred.

9. The method of claim 8 wherein $t_{k,i}$ is expressed as:

$$t_{k,i} = A^{\frac{t_k}{60}} + I_{k,i}$$

where $t_k$ is the elapsed time, in second, since the $k^{th}$ user-selection event occurred $$\log(A) = \frac{1}{10}(\log(N^2) - 2);$$

and $$I_{k,i} = \frac{1}{8\pi D p_{k-1}^2(i)}.$$

10. Computer instructions, stored in a computer-readable medium, that implement the method of claim 1.

11. A data-object-searching-and-perusal system comprising:
   data objects contained in a data-object library that provides data-object-access facilities that locate data objects based on data-object-access criteria;
   a presentation routine that electronically presents data-objects; and
   a grazing routine that
      continuously selects data objects from a current sub-population of data objects defined by current data-object-access criteria, based on a selection-criterion value associated with each data object, for input to the presentation routine for presentation, receives user input that modifies the current data-object-access criteria, in turn modifying the current sub-population from which data-objects are selected for presentation, to allow for input-directed navigation through the data-object library, and
      automatically relaxes data-object-access criteria during periods without input, to expand the current sub-population of data objects from which data objects are selected for presentation.

12. The data-object-searching-and-perusal system of claim 11 wherein data objects may include:
   photographic images;
   digitally-encoded video signals;
   digitally encoded audio signals;
   multi-media presentations;
   text and graphics-containing documents; and
   data files renderable by an application program.

13. The data-object-searching-and-perusal system of claim 11 wherein the presentation routine provides a logical data-object display from which display windows can be selected by a user.

14. The data-object-searching-and-perusal system of claim 13 wherein the presentation routine adds data objects, received at intervals from the grazing routine, to the logical data-object display and correspondingly translates the display window within the logical data-object display to present a continuously updated display.

15. The data-object-searching-and-perusal system of claim 11
   wherein input-based data-object-access-criteria modification, referred to as forced transitions, allow a user to steer data-object presentation to sub-populations of data objects potentially of interest to the user; and
   wherein grazing-routine relaxation of data-object-access-criteria, referred to as unforced transitions, provide for automatic sub-population expansion to facilitate user searching and browsing of the entire data-object library.

16. The data-object-searching-and-perusal system of claim 11 wherein the grazing routine continuously selects data objects from a current sub-population of data objects defined by current data-object-access criteria for input to the presentation routine for presentation by:
   maintaining a total probability distribution, combining probability distributions associated with each non-expired user-selection event, that represents the probability of each object in the population being potentially of interest to the user based on the selection-criterion value assigned to the object; and
   randomly selecting objects from the population of objects with a selection probability for each object proportional to the probability of the object being potentially of interest to the user according to the total probability distribution.

17. The data-object-searching-and-perusal system of claim 16:
   wherein the selection-criterion value x, assigned to an object i is a numeric value, with the selection-criterion values for the population of object falling along a continuous selection-criteria axis between and including a smallest selection-criterion value $x_{min}$ and a largest selection-criterion value $x_{max}$; and
   wherein a relative selection criterion of an object i to a user-selected object j is $|x_i - x_j|$.

18. The method of claim 17 wherein a probability distribution associated with a non-expired user-selection event, in which the user selected object j with election-criterion value $x_j$, is Gaussian-like, with mean $x_j$.

19. The method of claim 17 wherein the total probability distribution that represents the probability of each object in the population being potentially of interest to the user has multiple terms summed together and normalized, each term a Gaussian-like probability distribution associated with a non-expired user-selection event, in which the user selected object j with election-criterion value $x_j$.

20. The method of claim 17 wherein the total probability distribution is expressed as:

$$p_i = \frac{1}{K}\sum_{k=1}^{K} \beta_{k,i} e^{\frac{-(x_i-x_k)^2}{\gamma_{k,i}}} / \eta_k$$

where
- $p_i$ is the probability of object i being potentially of interest to a user;
- $x_i$ is the selection-criterion value associated with object i;
- $x_k$ is the selection criterion associated with object selected in the $k^{th}$ user-selection event;
- K is the number of non-expired user-selection events;
- $\beta_{k,i}$ is a coefficient that depends on an amount of time elapsed since the $k^{th}$ user-selection event occurred;
- $\gamma_{k,i}$ is a coefficient that depends on an amount of time elapsed since the $k^{th}$ user-selection event occurred; and
- $\eta_k$ is a normalization coefficient for the $k^{th}$-component probability distribution.

* * * * *

UNITED STATES PATENT AND TRADEMARK OFFICE
CERTIFICATE OF CORRECTION

| | | |
|---|---|---|
| PATENT NO. | : 9,047,496 B1 | Page 1 of 1 |
| APPLICATION NO. | : 11/799127 | |
| DATED | : June 2, 2015 | |
| INVENTOR(S) | : Widdowson et al. | |

It is certified that error appears in the above-identified patent and that said Letters Patent is hereby corrected as shown below:

In the claims

Column 22, line 26, Claim 2, delete "x," and insert -- $x_i$ --, therefor.

Column 24, line 51, Claim 17, delete "x," and insert -- $x_i$ --, therefor.

Signed and Sealed this
Eighth Day of December, 2015

Michelle K. Lee
*Director of the United States Patent and Trademark Office*